(12) United States Patent
Pertierra et al.

(10) Patent No.: US 12,276,808 B2
(45) Date of Patent: Apr. 15, 2025

(54) SYSTEMS AND METHODS FOR DIGITAL LASER PROJECTION WITH INCREASED CONTRAST USING FOURIER FILTER

(71) Applicant: DOLBY LABORATORIES LICENSING CORPORATION, San Francisco, CA (US)

(72) Inventors: Juan Pablo Pertierra, Fishers, IN (US); Martin J. Richards, Gig Harbor, WA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 1162 days.

(21) Appl. No.: 17/043,734

(22) PCT Filed: Apr. 1, 2019

(86) PCT No.: PCT/US2019/025217
§ 371 (c)(1),
(2) Date: Sep. 30, 2020

(87) PCT Pub. No.: WO2019/195182
PCT Pub. Date: Oct. 10, 2019

(65) Prior Publication Data
US 2021/0141238 A1 May 13, 2021

Related U.S. Application Data

(60) Provisional application No. 62/651,657, filed on Apr. 2, 2018.

(30) Foreign Application Priority Data
Jun. 28, 2018 (EP) .................................... 18180390

(51) Int. Cl.
G02F 1/01 (2006.01)
G02B 26/00 (2006.01)
(Continued)

(52) U.S. Cl.
CPC ....... *G02B 27/4244* (2013.01); *G02B 26/008* (2013.01); *G02B 26/0833* (2013.01);
(Continued)

(58) Field of Classification Search
CPC .. G02B 26/0841; G02B 26/00; G02B 26/101; G02B 26/004; G02B 26/105;
(Continued)

(56) References Cited

U.S. PATENT DOCUMENTS 6,637,894 B2  10/2003  Dewald
6,865,309 B2   3/2005  Dho
(Continued)

FOREIGN PATENT DOCUMENTS

CN  103777812 B   3/2017
CN  206115128      4/2017
(Continued)

OTHER PUBLICATIONS

US 9,906,760 B2, 02/2018, Damberg (withdrawn)
(Continued)

*Primary Examiner* — Dawayne Pinkney

(57) ABSTRACT

An optical filter to increase contrast of an image generated with a spatial light modulator includes a lens for spatially Fourier transforming modulated light from the spatial light modulator, and an optical filter mask positioned at a Fourier plane of the lens to filter the modulated light. The modulated light has a plurality of diffraction orders, and the optical filter mask transmits at least one of the diffraction orders of the modulated light and block a remaining portion of the modulated light. A method that improves contrast of an
(Continued)

image generated with a spatial light modulator includes spatially Fourier transforming modulated light from the spatial light modulator onto a Fourier plane, and filtering the modulated light by transmitting at least one diffraction order of the modulated light at the Fourier plane and blocking a remaining portion of the modulated light at the Fourier plane.

18 Claims, 25 Drawing Sheets

(51) Int. Cl.
- *G02B 26/08* (2006.01)
- *G02B 27/30* (2006.01)
- *G02B 27/42* (2006.01)
- *G03B 21/00* (2006.01)
- *H04N 9/31* (2006.01)

(52) U.S. Cl.
CPC ........... *G02B 27/30* (2013.01); *G03B 21/008* (2013.01); *H04N 9/3117* (2013.01)

(58) Field of Classification Search
CPC ..... G02B 26/001; G02B 26/08; G02F 1/0121; G02F 1/029; G02F 1/0018
USPC ........ 359/242, 290–292, 295, 223–225, 245, 359/298, 198, 317–318, 237
See application file for complete search history.

(56) References Cited

U.S. PATENT DOCUMENTS

| | | | |
|---|---|---|---|
| 6,967,986 B2 | 11/2005 | Kowarz | |
| 7,029,130 B2 | 4/2006 | Cannon | |
| 7,108,402 B2 | 9/2006 | MacKinnon | |
| 7,134,757 B2 | 11/2006 | Fushimi | |
| 7,298,532 B2 | 11/2007 | Thomas | |
| 7,400,458 B2 | 7/2008 | Farr | |
| 7,570,410 B2 * | 8/2009 | Pettitt | G03B 21/005 359/237 |
| 7,633,562 B2 | 12/2009 | Chilla | |
| 7,959,305 B2 | 6/2011 | Destain | |
| 8,120,996 B2 | 2/2012 | Noehte | |
| 8,253,844 B2 | 8/2012 | Neidrich | |
| 8,390,781 B2 | 3/2013 | Laidig | |
| 8,444,275 B2 | 5/2013 | Kurtz | |
| 9,025,136 B2 | 5/2015 | Chen | |
| 9,046,697 B2 | 6/2015 | Manni | |
| 9,300,900 B2 | 3/2016 | Allen | |
| 9,405,180 B2 | 8/2016 | Bowron | |
| 9,519,226 B2 | 12/2016 | Chen | |
| 9,622,662 B2 | 4/2017 | Zuzak | |
| 9,696,534 B2 | 7/2017 | Shroff | |
| 9,773,444 B2 | 9/2017 | Moffat | |
| 9,848,176 B2 | 12/2017 | Damberg | |
| 9,874,319 B2 | 1/2018 | Minor | |
| 10,408,390 B2 * | 9/2019 | Minor | F21V 29/90 |
| 10,416,539 B2 | 9/2019 | Pertierra | |
| 10,433,626 B2 | 10/2019 | Kurtz | |
| 2003/0231373 A1 | 12/2003 | Kowarz | |
| 2004/0150794 A1 | 8/2004 | Kurtz | |
| 2005/0024640 A1 | 2/2005 | Fateley | |
| 2006/0208175 A1 * | 9/2006 | Yun | G02B 26/0808 250/231.16 |
| 2008/0273234 A1 | 11/2008 | Mehrl | |
| 2009/0009730 A1 * | 1/2009 | Destain | G03B 21/28 353/121 |
| 2009/0161193 A1 | 6/2009 | Maeda | |
| 2012/0188620 A1 | 7/2012 | De Echaniz | |
| 2013/0176622 A1 | 7/2013 | Abrahamsson | |
| 2013/0265622 A1 | 10/2013 | Christmas | |
| 2016/0261832 A1 | 9/2016 | Gorny | |
| 2016/0327804 A1 | 11/2016 | Basler | |
| 2016/0381329 A1 | 12/2016 | Damberg | |
| 2017/0003392 A1 | 1/2017 | Bartlett | |
| 2017/0185037 A1 | 6/2017 | Lee | |
| 2017/0363741 A1 | 12/2017 | Send | |
| 2018/0048873 A1 | 2/2018 | Damberg | |

FOREIGN PATENT DOCUMENTS

| | | |
|---|---|---|
| CN | 106950660 A | 7/2017 |
| EP | 3939254 A1 | 1/2022 |
| GB | 2493517 B | 6/2013 |
| JP | 2004234007 A | 8/2004 |
| JP | 2016517029 A | 6/2016 |
| WO | 2006035279 A1 | 4/2006 |
| WO | 2012050901 | 4/2012 |
| WO | 2014142967 A1 | 9/2014 |

OTHER PUBLICATIONS

Barten, P. "Contrast Sensitivity of the Human Eye and Its Effects on Image Quality" Bellingham, WA, SPIE Press, Dec. 1999.

Damberg, Gerwin "Computational Projection Display Towards Efficient High Brightness Projection in Cinema" Thesis in the University of British Columbia, Jul. 2017.

Mansoor Shaik-Bahae "Fourier Optics 1 Background" New Mexico Optical Lab University Nov. 22, 2012.

Miller, S. M.N. et al "Perceptual Signal Coding for More Efficient Usage of Bit Codes" SMPTE Motion Imaging Journal (122), pp. 52-59.

Roh, J. et al "Full-Color Holographic Projection Display System Featuring an Achromatic Fourier Filter" Optics, Express, Jun. 19, 2017, pp. 14774-14782.

Dewald et al., "Advances in Contrast Enhancement for DLP Projection Displays," 2002 SID International Symposium, Seminar, and Exhibition, Boston, MA, May 21-23, 2002, Journal of the SID 11/1, pp. 177-181, 5 pages.

Meuret et al., "Contrast-Improving Methods for Digital Micromirror Device Projectors," Optical Engineering, vol. 42, No. 3, Mar. 2003, pp. 840-845, 6 pages.

* cited by examiner

SYSTEMS AND METHODS FOR DIGITAL LASER PROJECTION WITH INCREASED CONTRAST USING FOURIER FILTER

CROSS-REFERENCE TO RELATED APPLICATION

This application claims priority to U.S. Provisional Patent Application No. 62/651,657, filed Apr. 2, 2018, and to European Patent Application Number EP18180390.9, filed Jun. 28, 2018, each of which is incorporated herein by reference in its entirety.

BACKGROUND

Contrast of a projector indicates the brightest output of the projector relative to the darkest output of the projector. Contrast ratio is a quantifiable measure of contrast, defined as a ratio of the luminance of the projector's brightest output to the luminance of the projector's darkest output. This definition of contrast ratio is also referred to as "static" or "native" contrast ratio.

Due to visual adaptation of the human visual system, the range of luminances detectable by a viewer corresponds to a contrast ratio of approximately 1,000,000,000:1, even though at any instant the detectable range of luminances corresponds to a contrast ratio less than this value. For example, in scotopic vision, mediated exclusively by rod cells in the human eye, the detectable contrast ratio at any instant may be as high as 1,000,000:1 for some viewers, depending on the observed scene, the user's state of adaptation, and biological factors.

Viewers in a cinema environment may be in different adaptation states at any moment, and therefore may view the same scene with different contrast ratios. Changes in adaptation states between viewers may be due to different seating positions relative to the screen, where on the screen each viewer focuses, and when and how often each viewer closes their eyes. As a cinema is used by several viewers, an ideal projector has a contrast ratio high enough to accurately reproduce images for all viewers.

Some projectors that are compliant with the Digital Cinema Initiatives (DCI) specification have contrast ratios of 2,000:1 or less. For these digital projectors, dark and/or black regions of images may be projected with a luminance high enough that the regions appear brighter than intended.

SUMMARY OF THE EMBODIMENTS

In a first aspect, an optical filter to increase contrast of an image generated with a spatial light modulator includes a lens configured to spatially Fourier transform modulated light from the spatial light modulator, the modulated light including a plurality of diffraction orders. The optical filter also includes an optical filter mask positioned at a Fourier plane of the lens and configured to filter the modulated light, as spatially Fourier-transformed by the lens, by transmitting at least one diffraction order of the modulated light and blocking a remaining portion of the modulated light.

In certain embodiments of the first aspect, the at least one diffraction order is a zeroth diffraction order.

In certain embodiments of the first aspect, the optical filter mask has a transmissive region configured to transmit the zeroth diffraction order of the modulated light.

In certain embodiments of the first aspect, the at least one diffraction order includes a zeroth diffraction order and one or more first diffraction orders.

In certain embodiments of the first aspect, the optical filter mask has a transmissive region configured to transmit the zeroth diffraction order and two of the first diffraction orders.

In certain embodiments of the first aspect, the modulated light is one of red light, green light, and blue light.

In a second aspect, a modulator system for generating an image with increased contrast includes the optical filter of the first aspect, and a digital micromirror device implementing the spatial light modulator.

In a third aspect, a modulator system for generating an image with increased contrast includes the optical filter of the first aspect and a collimating lens positioned to collimate the at least one diffraction order of the modulated light transmitted by the optical filter mask.

In a fourth aspect, a modulator system for generating an image with increased contrast includes first, second, and third spatial light modulators configured to modulate, according to the image, respective first, second, and third lights to generate respective first, second, and third modulated lights. The modulator system also includes three instances of the optical filter of the first aspect forming respective first, second, and third optical filters configured to transmit at least one diffraction order of the respective first, second, and third modulated lights, generating respective first, second, and third filtered lights, and to block a remaining portion of the respective first, second, and third modulated lights. The modulator system also includes a beam combiner configured to combine the first, second, and third filtered lights into output light.

In certain embodiments of the fourth aspect, each of the first, second, and third optical filter masks of the respective first, second, and third optical filters has at least one transmissive region configured to transmit a zeroth diffraction order and one or more first diffraction orders of the first, second, and third modulated lights, respectively.

In certain embodiments of the fourth aspect, each of the first, second, and third spatial light modulators is a digital micromirror device.

In certain embodiments of the fourth aspect, the first, second, and third lights are red, green, and blue, respectively.

In certain embodiments of the fourth aspect, the modulator system further includes first, second, and third output lenses positioned to collimate the first, second, and third filtered lights, respectively, prior to combination by the beam combiner.

In certain embodiments of the fourth aspect, the modulator system further includes a projector lens configured to project the output light onto a screen.

In a fifth aspect, a time-multiplexed modulator system for generating an image with increased contrast includes a spatial light modulator configured to modulate, according to the image, time-multiplexed light into time-multiplexed modulated light forming a repeating sequence of first, second, and third modulated lights. The time-multiplexed modulator system also includes a lens configured to spatially Fourier transform the time-multiplexed modulated light onto a Fourier plane, and a filter wheel positioned at the Fourier plane and including a plurality of optical filter masks, each of the optical filter masks being configured to filter a corresponding one of the first, second, and third modulated lights, as spatially Fourier-transformed by the lens, by transmitting at least one diffraction order of the corresponding one of the first, second, and third modulated lights, and blocking a remaining portion of the corresponding one of the first, second, and third modulated lights. The filter wheel is configured to rotate synchronously with the time-multiplexed modulated light such that each of the optical filter masks is positioned in the time-multiplexed modulated light at the Fourier plane when the time-multiplexed modulated light is the corresponding one of the first, second, and third modulated lights.

In certain embodiments of the fifth aspect, the spatial light modulator is a digital micromirror device.

In certain embodiments of the fifth aspect, the plurality of optical filter masks is three sets of n optical filter masks, n being a positive integer, each of the three sets being configured to filter a respective one of the first, second, and third modulated lights.

In certain embodiments of the fifth aspect, the plurality of optical filter masks includes first, second, and third optical filter masks respectively configured to filter the first, second, and third modulated lights.

In certain embodiments of the fifth aspect, the first optical filter mask has a transmissive region configured to transmit a zeroth diffraction order and one or more first diffraction orders of the first modulated light, the second optical filter mask has a transmissive region configured to transmit a zeroth diffraction order and one or more first diffraction orders of the second modulated light, and the third optical filter mask has a transmissive region configured to transmit a zeroth diffraction order and one or more first diffraction orders of the third modulated light.

In certain embodiments of the fifth aspect, the first, second, and third modulated lights are red, green, and blue, respectively.

In certain embodiments of the fifth aspect, the filter wheel is further configured to rotate non-uniformly to stop when each of the first, second, and third optical filter masks is positioned in the time-multiplexed modulated light.

In certain embodiments of the fifth aspect, the time-multiplexed modulator system further includes a projector lens configured to project, onto a screen, the at least one diffraction order of the respective first, second, and third modulated lights transmitted by the filter wheel.

In a sixth aspect, a method to improve contrast of an image generated with a spatial light modulator includes spatially Fourier transforming modulated light from the spatial light modulator onto a Fourier plane, the modulated light including a plurality of diffraction orders. The method also includes filtering the modulated light by transmitting at least one diffraction order of the modulated light at the Fourier plane, and blocking a remaining portion of the modulated light at the Fourier plane.

In certain embodiments of the sixth aspect, the at least one diffraction order is a zeroth diffraction order.

In certain embodiments of the sixth aspect, the transmitting includes transmitting the zeroth diffraction order through a transmissive region of an optical filter mask.

In certain embodiments of the sixth aspect, the at least one diffraction order includes a zeroth diffraction order and one or more first diffraction orders.

In certain embodiments of the sixth aspect, the transmitting includes transmitting the zeroth diffraction order and the one or more first diffraction orders through a transmissive region of an optical filter mask.

In certain embodiments of the sixth aspect, the modulated light is one of red light, green light, and blue light.

In certain embodiments of the sixth aspect, the method further includes manipulating a plurality of micromirrors of the spatial light modulator to generate the modulated light.

In certain embodiments of the sixth aspect, the method further includes collimating, after the transmitting, the at least one diffraction order.

In a seventh aspect, a method to project a color image with increased contrast includes spatially modulating first, second, and third input lights, according to the color image, to generate respective first, second, and third modulated lights, each of the first, second, and third modulated lights including a plurality of diffraction orders. The method also includes filtering the first, second, and third modulated lights into respective first, second, and third filtered lights by (i) transmitting at least one of the diffraction orders of the respective first, second, and third modulated lights, (ii) blocking a remaining portion of the respective first, second, and third modulated lights, and (iii) combining the first, second, and third filtered lights into output light.

In certain embodiments of the seventh aspect, the first, second, and third input lights are red, green, and blue, respectively.

In certain embodiments of the seventh aspect, the method further includes projecting the output light onto a screen.

In an eighth aspect, a time-multiplexing method for generating and projecting an image with increased contrast includes modulating, according to the image, time-multiplexed light with a spatial light modulator to generate time-multiplexed modulated light forming a repeating sequence of first, second, and third modulated lights. The method also includes spatially Fourier transforming the time-multiplexed modulated light with a lens, and filtering the time-multiplexed modulated light by rotating a filter wheel synchronously with the time-multiplexed modulated light. The filter wheel includes a plurality of optical filter masks, each of the optical filter masks configured to filter a corresponding one of the first, second, and third modulated lights as spatially Fourier-transformed by the lens. The rotating includes positioning each of the optical filter masks in the time-multiplexed modulated light at a Fourier plane of the lens when the time-multiplexed modulated light is the corresponding one of the first, second, and third modulated lights.

In certain embodiments of the eighth aspect, the spatial light modulator is a digital micromirror device.

In certain embodiments of the eighth aspect, the plurality of optical filter masks is three sets of n optical filter masks, n being a positive integer, each of the three sets being configured to filter a respective one of the first, second, and third modulated lights.

In certain embodiments of the eighth aspect, the plurality of optical filter masks is first, second, and third optical filter masks respectively configured to filter the first, second, and third modulated lights.

In certain embodiments of the eighth aspect, the filtering includes transmitting a zeroth diffraction order and one or more first diffraction orders of the first modulated light through a transmissive region of the first optical filter mask, transmitting a zeroth diffraction order and one or more first diffraction orders of the second modulated light through a transmissive region of the second optical filter mask, and transmitting a zeroth diffraction order and one or more first diffraction orders of the third modulated light through a transmissive region of the third optical filter mask.

In certain embodiments of the eighth aspect, the first, second, and third modulated lights are red, green, and blue, respectively.

In certain embodiments of the eighth aspect, the rotating further includes rotating non-uniformly and stopping when each of the first, second, and third optical filter masks is positioned in the time-multiplexed modulated light.

In certain embodiments of the eighth aspect, the method further includes projecting, after the filtering, the time-multiplexed modulated light, as filtered, onto a screen.

DETAILED DESCRIPTION OF THE EMBODIMENTS

Figure 1:
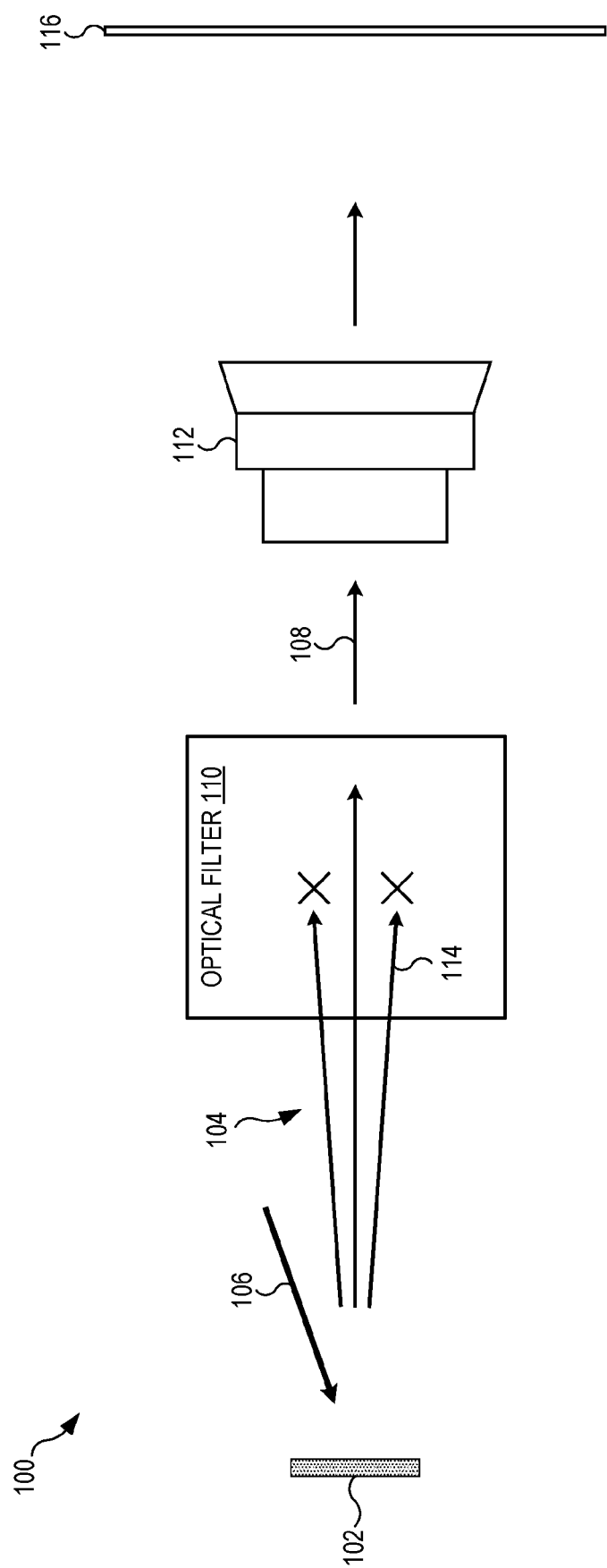
FIG. 1 is a functional diagram of an optical filter that improves contrast of an image generated with a spatial light modulator, in embodiments.

FIG. 1 is a functional diagram of an optical filter 110 that improves contrast of an image generated with a spatial light modulator (SLM). FIG. 1 shows optical filter 110 in one use scenario, wherein optical filter 110 is implemented in a digital projector 100 to increase contrast of an image projected by digital projector 100 onto a screen 116. Digital projector 100 includes an SLM 102 that modulates input light 106 into modulated light 104 according to inputted data representative of the image to be projected by digital projector 100.

Optical filter 110 filters modulated light 104 by blocking a portion 114 of modulated light 104 that digital projector 100, in the absence of optical filter 110, would project onto screen 116 even when SLM 102 is controlled to output no light toward screen 116. Optical filter 110 outputs, as filtered light 108, a transmitted portion of modulated light 104. Digital projector 100 includes a projection lens 112 that projects filtered light 108 onto screen 116. In the absence of optical filter 110, blocked portion 114 of modulated light 104 corresponds to a lower bound of a luminous intensity of digital projector 100, and therefore determines how dark the projected image is. By blocking blocked portion 114 of modulated light 104, optical filter 110 reduces the lower bound, thereby increasing the contrast of digital projector 100.

As described in more detail below, blocked portion 114 of modulated light 104 corresponds to one or more diffraction orders of modulated light 104 produced when input light 106 diffracts off SLM 102. SLM 102 may be any type of spatial light modulator that (1) has a periodic structure acting as a diffraction grating, and (2) modulates the optical phase of input light 106 to steer light between two states (e.g., ON and OFF states). In one example, SLM 102 is a digital micromirror device (DMD) that steers light by tilting a plurality of micromirrors to modulate the optical phase of input light 106. In other examples, SLM 102 is a reflective liquid crystal on silicon (LCOS) phase modulator, or a transmissive liquid crystal (LC) phase modulator, each of which steers light by modulating the refractive index of the liquid crystal.

Figure 2:
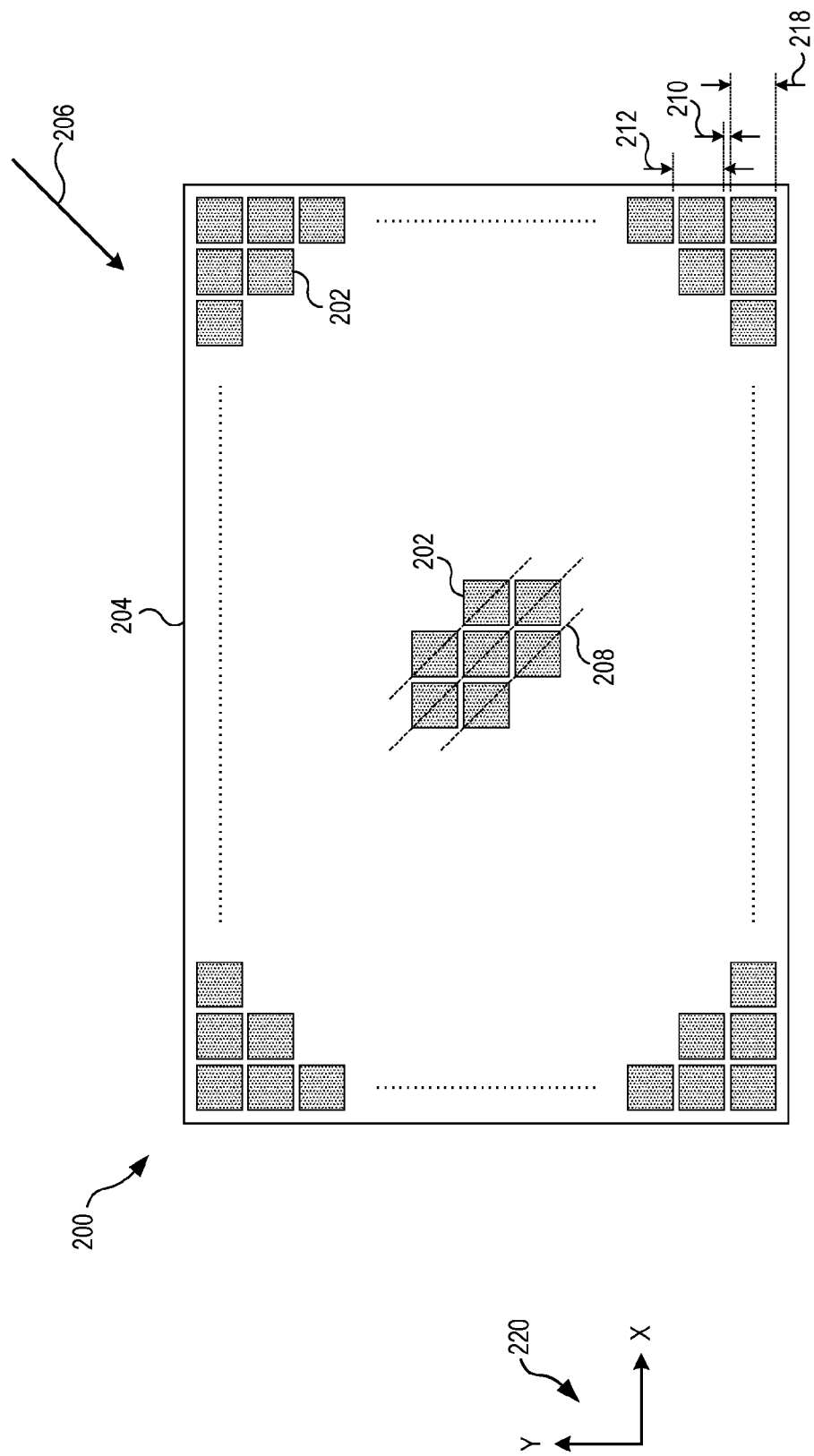
FIGS. 2 and 3 are front and side views, respectively, of a digital micromirror device (DMD) used to generate an image as part of a digital projector.
Figure 3:
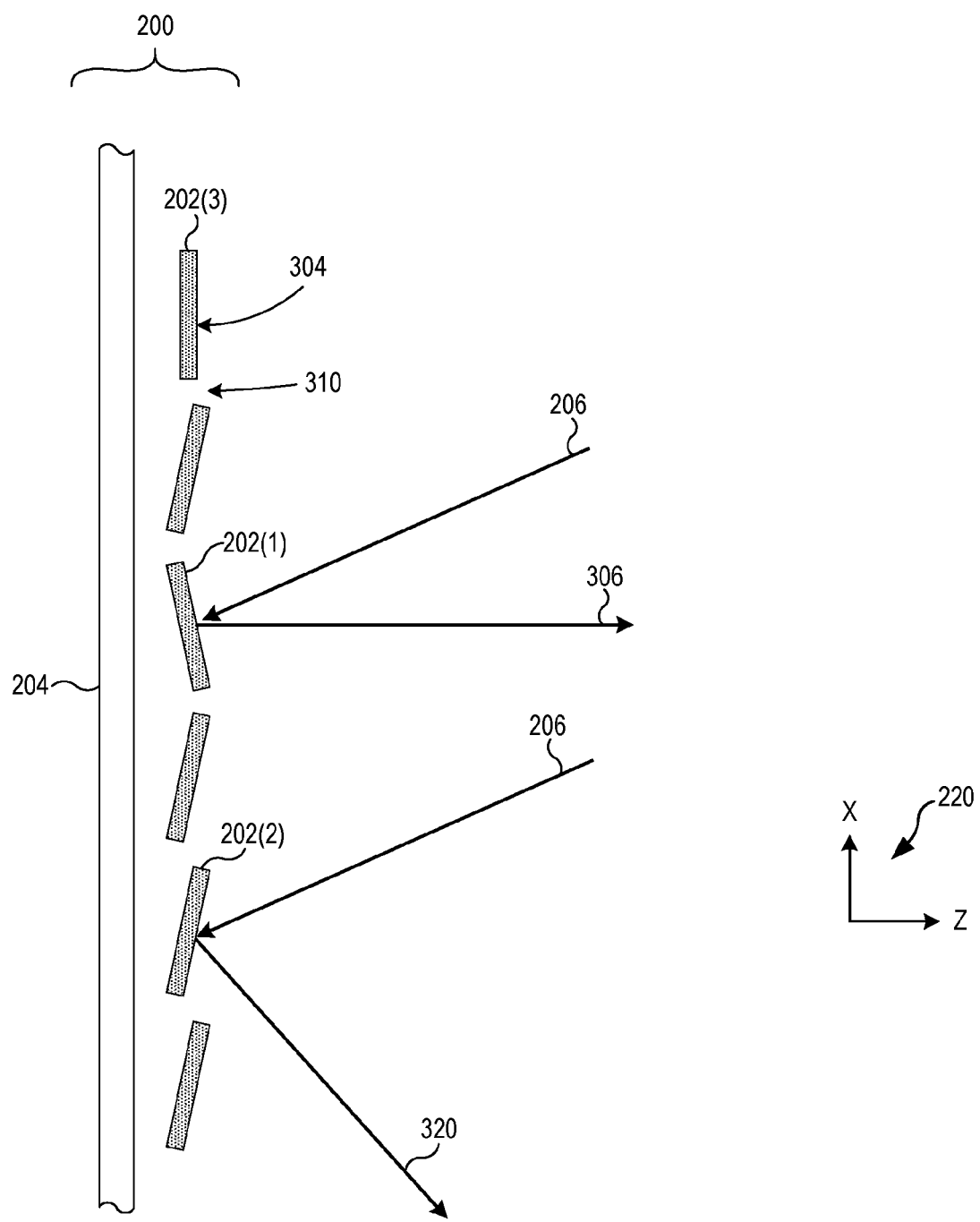

FIGS. 2 and 3 are front and side views, respectively, of a DMD 200 used to generate an image as part of a digital projector (e.g., digital projector 100). DMD 200 is one example of SLM 102. FIGS. 2 and 3 are best viewed together in the following description.

DMD 200 is a micro-opto-electromechanical system (MOEMS) SLM having a plurality of square micromirrors 202 arranged in a two-dimensional rectangular array on a substrate 204 lying in the x-y plane (see right-handed coordinate system 220). In certain embodiments, DMD 200 is a digital light processor (DLP) from Texas Instruments. Each of micromirrors 202 may correspond to one pixel of the image, and may be tilted about a rotation axis 208, oriented at −45° to the x-axis, by electrostatic actuation to steer input light 206. For clarity, FIG. 2 only shows representative micromirrors 202 at the corners and center of DMD 200, and not all micromirrors 202 are labeled in FIG. 3.

FIG. 3 shows micromirrors 202 tilted to steer input light 206. Micromirror 202(1) is actuated in an ON position to specularly reflect input light 206 into ON-reflected light 306 parallel to the z-axis (see coordinate system 220). Micromirror 202(2) is actuated in an OFF position to specularly reflect input light 206 into OFF-reflected light 320 directed toward a beam dump (not shown) that absorbs OFF-reflected light 320. Micromirror 202(3) is unactuated, lying parallel to substrate 204 (e.g., the x-y plane) in a flat-state. A front face 304 of each of micromirrors 202 may be coated with a layer of deposited metal (e.g., aluminum) that acts as a reflective surface for reflecting input light 206. Gaps 310 between neighboring micromirrors 202 may be absorptive, i.e., input light 206 that enters gaps 310 is absorbed by substrate 204. For clarity, mechanical structures physically coupling micromirrors 202 to substrate 204 are not shown. Without departing from the scope hereof, DMD 200 may be implemented to direct ON-reflected light 306 and OFF-reflected light 320 in respective directions different from those shown in FIG. 3. In addition, DMD 200 may be configured such that each of micromirrors 202 lies at any angle to substrate 204 when unactuated.

A digital projector using DMD 200 may be designed by only considering specular reflections of input light 206 off micromirrors 202. However, micromirrors 202 and gaps 310 cooperate to form a two-dimensional grating that diffracts input light 206. Therefore, modulated light propagating away from DMD 200 may form a plurality of diffraction orders observable as a Fraunhofer diffraction pattern (see diffraction patterns 700 and 800 of FIGS. 7 and 8, respectively) in a far-field region of DMD 200 or at a focal plane of a lens. Each diffraction order corresponds to one light beam propagating away from DMD 200 in a unique respective direction. By design, most of the optical power of modulated light from DMD 200 is in the zeroth diffraction order, corresponding to specularly reflected ON- and OFF-reflected lights 306 and 320.

Diffraction of input light 206 by DMD 200 may reduce a projector contrast ratio (PCR) of a digital projector using DMD 200 (e.g., digital projector 100 of FIG. 1 in the absence of optical filter 110). The PCR of a projector is defined herein as a ratio of ON and OFF luminous intensities (or, equivalently, first and second photometric luminances) measured at a projection screen (e.g., screen 116 of FIG. 1) illuminated by the projector. ON and OFF luminous intensities are generated when the projector is controlled to output its brightest output (e.g., white) and its darkest output (e.g., black), respectively. When the digital projector uses DMD 200, ON and OFF luminous intensities are generated when all micromirrors 202 are in ON and OFF positions, respectively.

How DMD 200 diffracts input light 206 may be determined by a variety of parameters, such as (1) the wavelength of input light 206, (2) the direction of input light 206, (3) a pitch 212 of DMD 200, (4) a width 210 of gaps 310 of DMD 200, and (5) the ON and OFF tilt angles of micromirrors 202. In both x and y directions of DMD 200, pitch 212 equals a sum of width 210 and a micromirror edge length 218, as shown in FIG. 2. Pitch 212 may be between 5 and 15 microns. Width 210 may be less than 1 micron. In one example, pitch 212 is between 7 and 8 microns and width 210 is between 0.7 and 0.9 microns.

Figure 4:
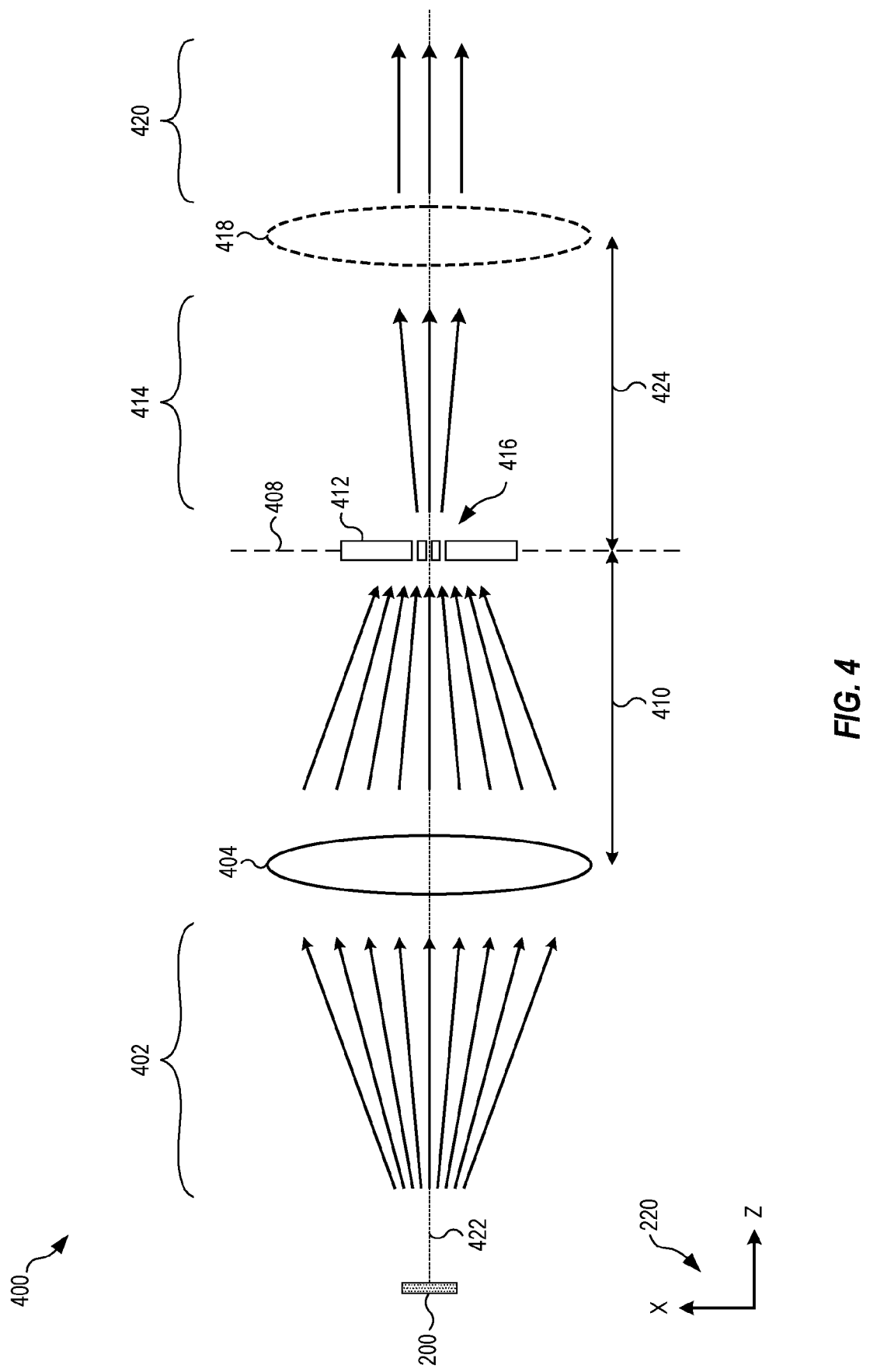
FIG. 4 is a side view of an optical filter that spatially filters modulated light from the DMD of FIGS. 2 and 3, in embodiments.

FIG. 4 is a side view of an optical filter 400 that spatially filters modulated light 402 from DMD 200 to increase the PCR of digital projector 100. Optical filter 400 is one example optical filter 110. In optical filter 400, DMD 200 may be replaced by another type of SLM 102 (e.g., reflective LCOS or transmissive LC phase modulator) without departing from the scope hereof. Optical filter 400 includes a lens 404 that spatially Fourier transforms modulated light 402 by focusing modulated light 402 onto a Fourier plane 408. Modulated light 402 is shown in FIG. 4 as a plurality of arrows, each corresponding to one diffraction order and pointing in a unique direction along which the one diffraction order propagates. In one embodiment, DMD 200 is centered on an optical axis 422 defined by lens 404, as shown in FIG. 4. In another embodiment, DMD 200 is off-centered from optical axis 422. Lens 404 has a focal length 410, and Fourier plane 408 lies at a focal plane of lens 404. An optical filter mask 412 located at Fourier plane 408 spatially filters modulated light 402, as Fourier transformed by lens 404. The spatial Fourier transform imposed by lens 404 converts the propagation angle of each diffraction order of modulated light 402 to a corresponding spatial position on Fourier plane 408. Lens 404 thereby enables selection of desired diffraction orders, and rejection of undesired diffraction orders, by spatial filtering at Fourier plane 408. The spatial Fourier transform of modulated light 402 at Fourier plane 408 is equivalent to a Fraunhofer diffraction pattern of modulated light 402.

Optical filter mask 412 has at least one transmissive region 416 that fully or partially transmits at least one diffraction order of modulated light 402 through optical filter mask 412 as filtered light 414. In certain embodiments, optical filter mask 412 is opaque where undesired diffraction orders of modulated light 402 are incident. In some embodiments, optical filter mask 412 is opaque where optical filter mask 412 does not have a transmissive region 416. In other embodiments, optical filter mask 412 is configured to reflect, as opposed to transmit, desired diffraction orders to spatially separate desired diffraction orders from undesired diffraction orders.

In one embodiment, optical filter 400 includes a collimating lens 418 that collimates filtered light 414 into collimated light 420. Collimation lens 418 may ease integration of optical filter 400 with other optical elements or systems. For example, lens 418 may couple filtered light 414 to additional optics located after optical filter 400 (e.g., projector lens 112, or beam combiner 1504 discussed below in reference to FIG.

15). Collimating lens 418 has a focal length 424, and is positioned such that a focal plane of collimating lens 418 coincides with Fourier plane 408. While focal lengths 410 and 424 are shown in FIG. 4 as being equal, focal lengths 410 and 424 may differ from each other without departing from the scope hereof. In another embodiment, optical filter 400 includes a lens similar to collimating lens 418 that optically couples filtered 414 to additional optics located after optical filter 400 (e.g., projector lens 112).

For clarity, FIG. 4 only shows diffracted beams diffracting in one dimension (e.g., the x-direction). However, DMD 200 diffracts in two dimensions, such that modulated light 402 also includes diffracted beams that have been diffracted, by DMD 200, in a second dimension perpendicular to optical axis 422 (e.g., the y-direction). Each diffracted beam in a two-dimensional diffraction pattern may be labeled by a pair of integers identifying the diffraction order of the diffracted beam for each of the two dimensions. Herein, "zeroth order" refers to the one diffracted beam that has order zero in both of the two dimensions. Also without departing from the scope hereof, each arrow depicted in FIG. 4 as part of modulated light 402 may indicate a group of neighboring diffraction orders, such as the group consisting of the zeroth diffraction order and a plurality of first diffraction orders.

Figure 5:
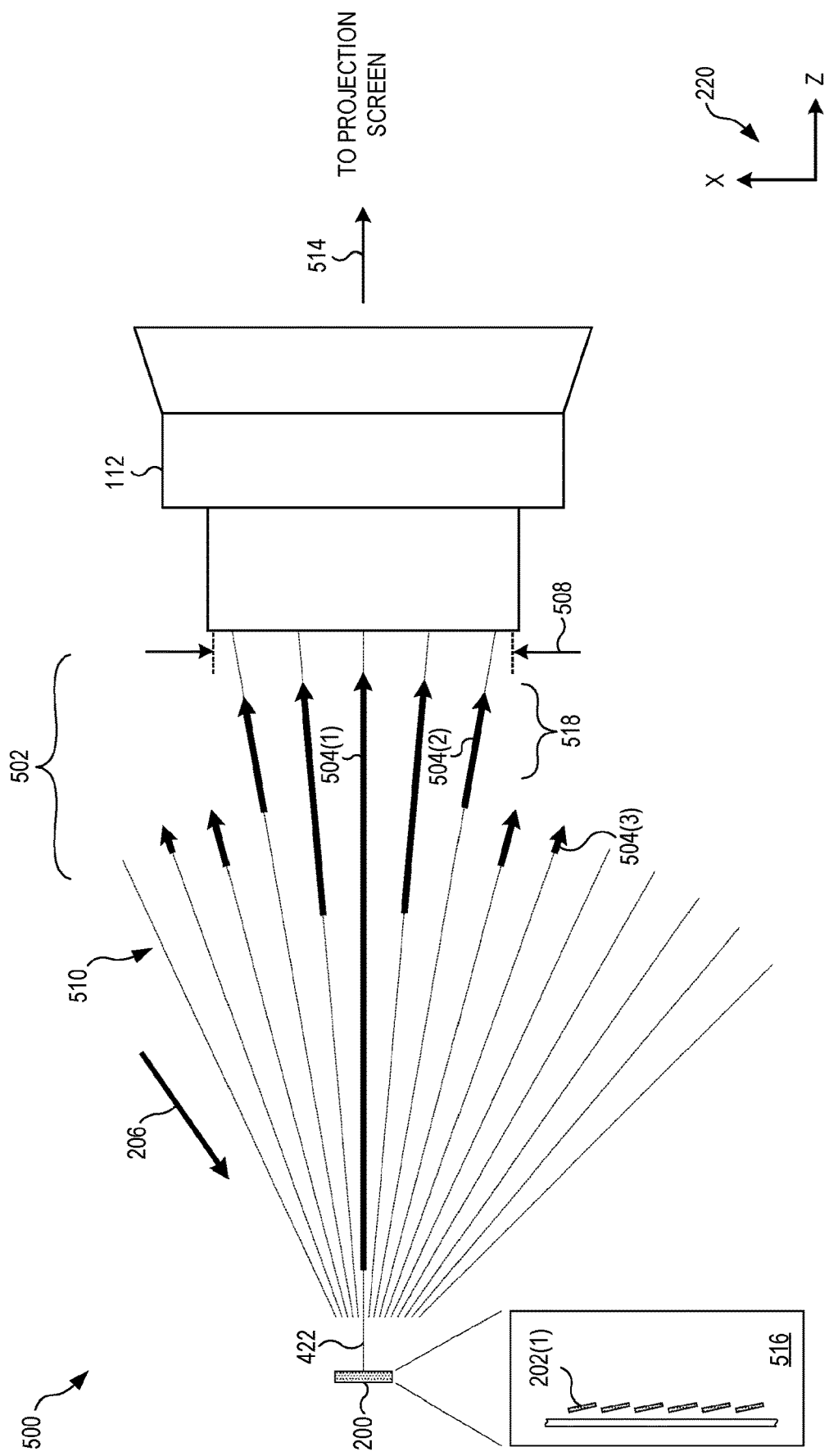
FIGS. 5 and 6 are side views of an example digital projector that includes the DMD of FIGS. 2 and 3 and a projector lens, but does not include the optical filter of FIG. 1.
Figure 6:
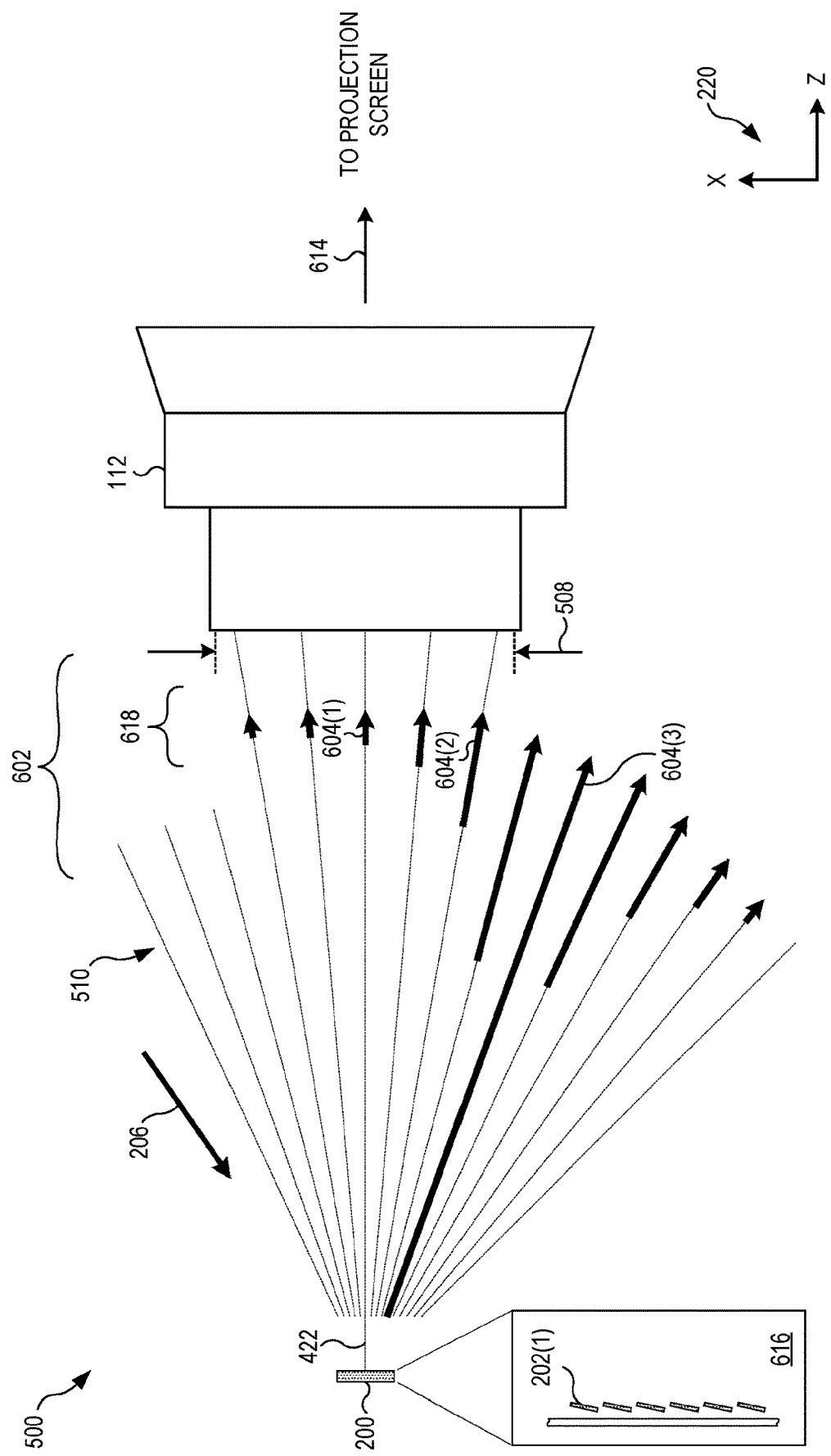

FIGS. 5 and 6 are side views of an example digital projector 500 that includes DMD 200 and projector lens 112, but does not include optical filter 110. FIGS. 5 and 6 illustrate how diffraction orders of modulated light 402 from DMD 200 reduce the PCR of digital projector 500. In FIG. 5, digital projector 500 generates ON luminous intensity by actuating all micromirrors 202 of DMD 200 in the ON position (see micromirror 202(1) in magnified view 516). In FIG. 6, digital projector 500 generates OFF luminous intensity by actuating all micromirrors 202 of DMD 200 in the OFF position (see micromirror 202(1) in magnified view 616). In FIGS. 5 and 6, DMD 200 and projector lens 112 are centered in x and y directions (see coordinate system 220) on optical axis 422. FIGS. 5 and 6 are best viewed together in the following description.

In FIG. 5, DMD 200 diffracts input light 206 into ON-modulated light 502 having a plurality of ON-diffraction beams 504. In FIG. 6, DMD 200 diffracts input light 206 into OFF-modulated light 602 having a plurality of OFF-diffraction beams 604. In a far-field region of DMD 200, each of ON-diffracted beams 504 corresponds to one diffraction order or peak of a Fraunhofer diffraction pattern formed by ON-modulated light 502, and each of OFF diffracted beams 604 corresponds to one diffraction order or peak of a Fraunhofer diffraction pattern formed by OFF-modulated light 602. In the far-field region of DMD 200, each of ON and OFF diffracted beams 504, 604 corresponds to a k-vector having one of a plurality of propagation directions 510. In the example of FIGS. 5 and 6, propagation directions 510 are represented as dashed lines; each of ON- and OFF-diffracted beams 504, 604 is aligned with one of propagation directions 510 and is represented by a solid arrow having a length corresponding to its power or intensity.

One aspect of the present embodiments is the realization that, for a fixed direction of input light 206, the power/intensity of ON- and OFF-diffracted beams 504, 604 changes when micromirrors 202 of DMD 200 are switched between ON and OFF positions, whereas propagation directions 510 of ON- and OFF-diffracted beams 504, 604 remain the same when micromirrors 202 of DMD 200 are switched between ON and OFF positions.

In the example of FIG. 5, input light 206 is a monochromatic plane wave illuminating DMD 200 and propagating toward DMD 200 such that an ON-diffracted beam 504(1) propagates along optical axis 422. ON-diffracted beam 504(1) contains most of the power of ON-modulated light 502. ON-diffracted beam 504(1) may represent a zeroth diffraction order, or a plurality of neighboring diffraction orders (e.g., a zeroth diffraction order and several first diffraction orders), of ON-modulated light 502.

FIG. 5 also shows an ON-diffracted beam 504(2) propagating along a different direction than ON-diffracted beam 504(1), but still passing through a clear aperture 508 of projector lens 112. The power in ON-diffracted beam 504(2) is less than the power in ON-diffracted beam 504(1). A plurality of ON-diffracted beams 518, including ON-diffracted beams 504(1) and 504(2), pass through clear aperture 508 of projector lens 112, which projects ON-diffracted beams 518 onto a projection screen as ON-projected light 514.

FIG. 5 also shows an ON-diffracted beam 504(3) propagating along a direction missing clear aperture 508. Projector lens 112 does not project ON-diffracted beam 504(3) onto the projection screen. The power in ON-diffracted beam 504(3) is a small fraction of the power of ON-modulated light 502. Therefore, the exclusion of ON-diffracted beam 504(3) from ON-projected light 514 minimally impacts the optical power efficiency of digital projector 500.

FIG. 6 shows OFF-diffracted beams 604(1), 604(2), 604(3) corresponding to respective ON-diffracted beams 504(1), 504(2), 504(3) of FIG. 5. OFF-diffracted beam 604(3) propagates away from optical axis 422, missing clear aperture 508. Most of the power of OFF-modulated light 602 is in OFF-diffracted beam 604(3) and therefore will not be projected onto the projection screen.

In FIG. 6, OFF-diffracted beams 604(1) and 604(2) pass through clear aperture 508 and are projected as part of OFF-projected light 614. The power in OFF-diffracted beams 604(1) and 604(2) is small compared to the power in OFF-diffracted beam 604(3). However, the power in OFF-diffracted beams 604(1) and 604(2) increase the OFF luminous intensity of digital projector 500, thereby decreasing the PCR of digital projector 500.

With most of the optical power of ON-modulated light 502 being in ON-diffracted beam 504(1), other ON-diffraction beams 504 in the plurality of ON-diffracted beams 518 passing through clear aperture 508 to form ON-projected light 514 contain relatively little power, and therefore contribute negligibly to the power in ON-projected light 514. However, corresponding OFF-diffracted beams 604 passing through clear aperture 508 may significantly increase the power in OFF-projected light 614, decreasing the PCR of digital projector 500.

Another aspect of the present embodiments is the realization that diffraction orders corresponding to ON-diffracted beams with low optical powers, like ON-diffracted beam 504(2) described above, may be filtered to increase PCR with minimal decrease in optical power output and efficiency of digital projector 500. To identify diffraction orders to filter, diffraction order contrast ratio (DOCR) may be used. For each of propagation directions 510 passing through clear aperture 508, DOCR is defined herein as a ratio of the optical powers of a pair of corresponding ON- and OFF-diffracted beams of the same diffraction order and propagation direction. For example, the diffraction order corresponding to ON- and OFF-diffracted beams 504(1) and 604(1) has a high DOCR. Diffraction orders with high DOCR are beneficial to increasing the PCR, and may be advantageously selected for projection to the projection screen. On the other hand, ON- and OFF-diffracted beams 504(2) and 604(2) correspond to a diffraction order with a low DOCR. Diffraction orders with low DOCR decrease the PCR and may be advantageously filtered out to increase the PCR of digital projector 500.

For clarity, FIGS. 5 and 6 only show diffracted beams 504, 604 diffracting in one dimension (e.g., the x-direction). However, DMD 200 diffracts input light 206 in two dimensions, such that modulated lights 502 and 602 also include diffracted beams that have been diffracted by DMD 200 in a second dimension perpendicular to optical axis 512 (e.g., the y-direction).

Figure 7:
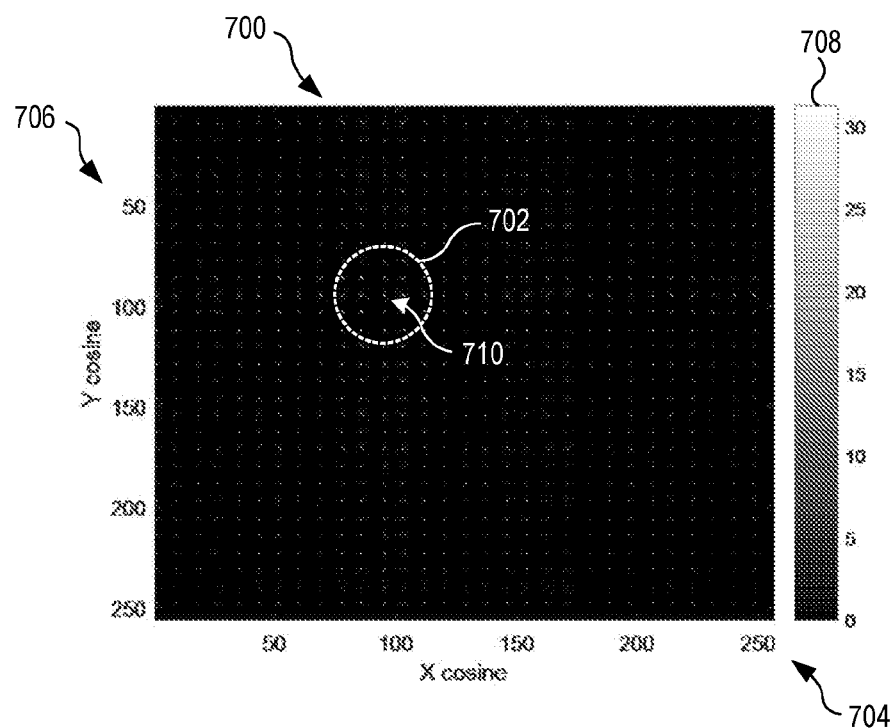
FIGS. 7 and 8 are intensity plots of example Fraunhofer diffraction patterns of ON- and OFF-modulated lights, respectively.
Figure 8:
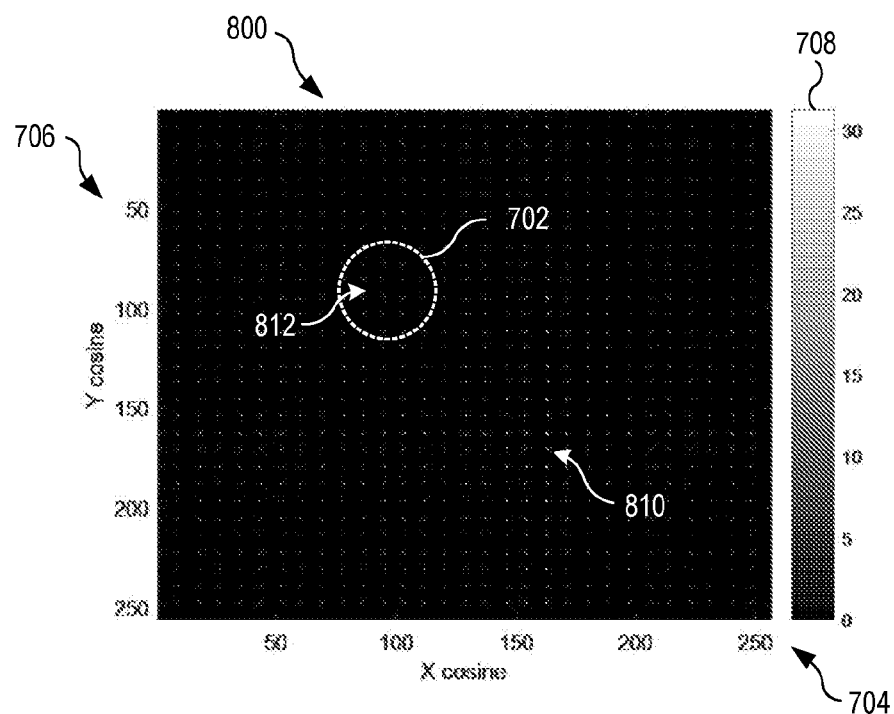

FIGS. 7 and 8 are intensity plots of example Fraunhofer diffraction patterns 700 and 800 of ON- and OFF-modulated lights 502 and 602, respectively. Diffraction patterns 700 and 800 correspond to Fourier transforms produced by lens 404 at Fourier plane 408 when digital projector 100 operates with DMD 200 and optical filter 400. Diffraction patterns 700 and 800 were generated numerically according to a procedure described in more detail below in the section "Numerical Analyses". Each of diffraction patterns 700 and 800 includes a plurality of equally-spaced diffraction peaks corresponding to diffracted beams 504 and 604, respectively. In FIGS. 7 and 8, a horizontal axis 704 and a vertical axis 706 indicate direction cosines of diffraction peaks relative to x and y axes, respectively, of coordinate system 220. In FIGS. 7 and 8, intensities of diffraction patterns 700 and 800 are indicated according to an intensity scale 708.

Circle 702 of FIGS. 7 and 8 represents clear aperture 508 of FIGS. 5 and 6. Diffraction peaks lying within circle 702 represent diffracted beams 518, 618 that are projected by projector lens 112 as ON- and OFF-projected lights 514, 614, respectively. In FIG. 7, a brightest (e.g., highest intensity) diffraction peak 710 at a center of circle 702 corresponds to ON-diffraction beam 504(1) of FIG. 5 and/or a zeroth order of ON-modulated light 502. Diffraction peaks lying outside of circle 702 will not be projected onto the projection screen.

In FIG. 8, a brightest diffraction peak 810, corresponding to OFF-diffraction beam 604(3), is at higher values of directional cosines outside circle 702, and therefore will not be projected onto the projection screen. However, a plurality of low-power diffraction peaks 812 in circle 702 will be projected onto projection screen as OFF projected light 614, increasing OFF luminous intensity and decreasing the PCR.

To increase the PCR, optical filter 400 may be implemented to reduce OFF-luminous intensity by blocking diffraction orders lying within circle 702 that contribute relatively more to OFF luminous intensity than ON luminous intensity. Fraunhofer diffraction patterns 700 and 800 are representative of Fourier transforms of modulated light 402, and illustrate how transmissive regions 416 may be configured so that optical filter mask 412 transmits desired diffraction orders for projection, and blocks all other undesired diffraction orders that otherwise would be projected. Specifically, using parameters of lens 404, the direction cosines associated with each desired diffraction peak may be converted to a spatial position on optical filter mask 412 at which a transmissive region 416 may be positioned to transmit the desired diffraction peak through optical filter mask 412. Similarly, the direction cosines associated with each undesired diffraction peak may be converted to a spatial position on optical filter mask 412 at which optical filter mask 412 is opaque to block (e.g., filter) the undesired diffraction peak.

In one embodiment, optical filter mask 412 includes one transmissive region 416 having a size, geometry, location, and orientation selected to optimize the PCR and/or optical power efficiency of a digital projector. In another embodiment, optical filter mask 412 has a plurality of transmissive regions 416, and the size, geometry, location, and/or orientation are selected for each transmissive region 416 to optimize the PCR and/or optical power efficiency of a digital projector.

FIGS. 9-14 are front views of examples of optical filter mask 412 of FIG. 4, showing example configurations of transmissive region(s) 416. In each of FIGS. 9-14, a plurality of locations 902 of diffraction orders, such as diffraction orders associated with different pairs of corresponding ON- and OFF-diffracted beams 504 and 604, are indicated by X's forming a two-dimensional grid. For example, in FIG. 9, location 902(2) indicates one diffraction order blocked by an optical filter mask 900, while location 902(1) indicates one diffraction order transmitted by optical filter mask 900.

Figure 9:
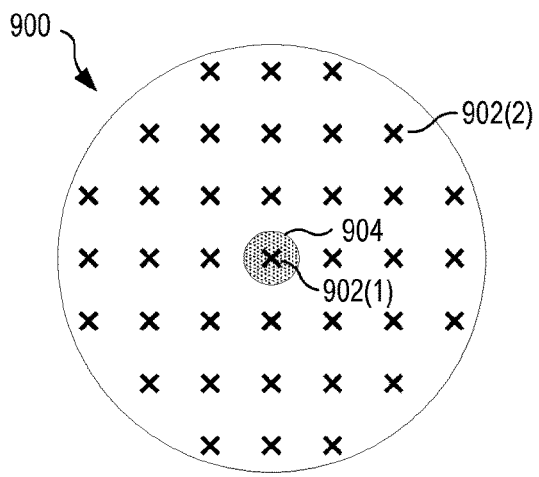
FIGS. 9-14 are front views of examples of the optical filter mask of FIG. 4, showing example configurations of transmissive region(s), in embodiments.
Figure 10:
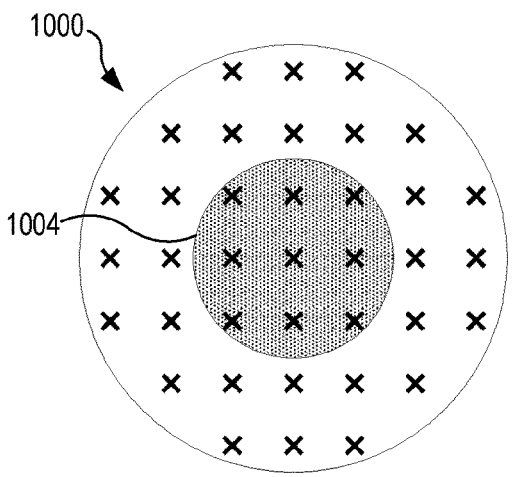

FIGS. 9 and 10 show example optical filter masks 900 and 1000 having circular transmissive regions 904 and 1004, respectively. Each of circular transmission regions 904 and 1004 may be a hole or a material that is at least partly transmissive to light. Circular transmissive regions 904 and 1004 are examples of transmissive region 416. Circular transmissive region 904 is sized to transmit one diffraction order through optical filter mask 900. Circular transmissive region 1004 is sized to transmit a plurality of diffraction orders through optical filter mask, for example nine diffraction orders forming a 3×3 grid, as shown in FIG. 9. Although FIGS. 9 and 10 show circular transmissive regions 904 and 1004 as centered on respective optical filter masks 900 and 1000, and thus centered on optical axis 422, circular transmissive regions 904 and 1004 may be off-centered without departing from the scope hereof.

Figure 11:
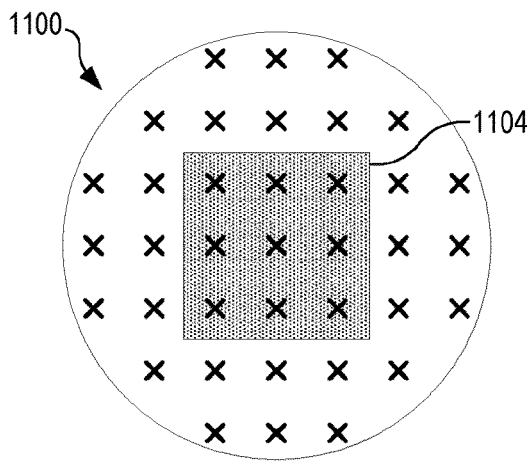
Figure 12:
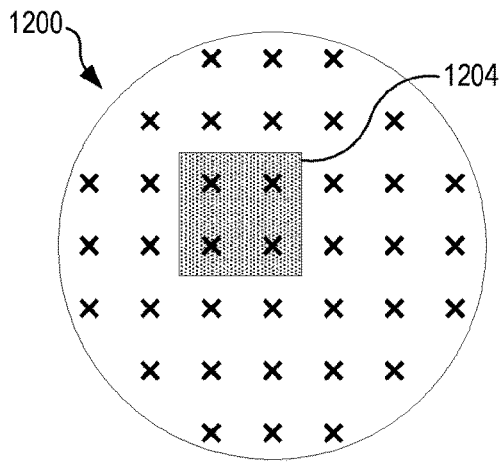

FIGS. 11 and 12 show example optical filter masks 1100 and 1200 having square transmissive regions 1104 and 1204, respectively. Each of square transmission regions 1104 and 1204 may be a square hole or a square-shaped material that is at least partly transmissive to light. Square transmissive regions 1104 and 1204 are examples of transmissive region 416. Square transmissive region 1104 is centered on optical filter mask 1100 and is sized to transmit a plurality of diffraction orders through optical filter mask 1100, such as nine diffraction orders forming a 3×3 grid, as shown in FIG. 11. Square transmissive region 1204 is off-centered on optical filter mask 1200 and is sized to transmit a plurality of diffraction orders through optical filter mask 1200, such as four diffraction orders forming a 2×2 grid.

Figure 13:
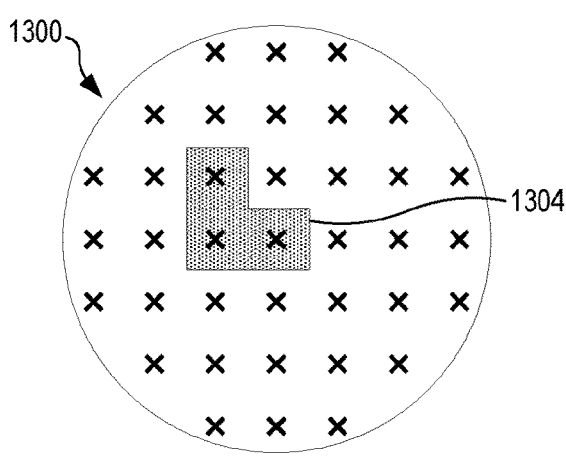

FIG. 13 shows an example optical filter mask 1300 having an irregular polygonal transmissive region 1304 configured to transmit three neighboring diffraction orders through optical filter mask 1300. Irregular polygonal transmissive region 1304 is an example of transmissive region 416 and may be a hole or a material that is at least partly transmissive to light.

Figure 14:
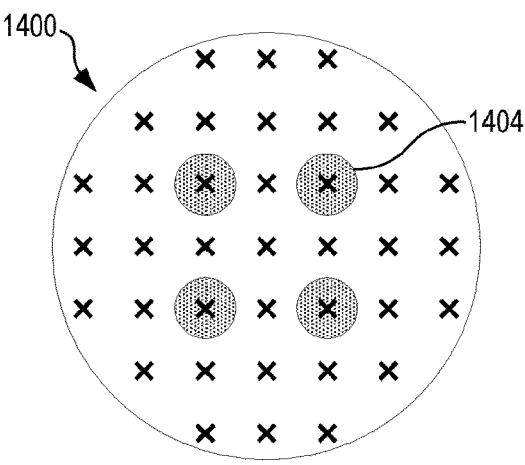

FIG. 14 shows an example optical filter mask 1400 having a plurality of circular transmissive regions 1404, each positioned and sized to transmit one diffraction order through optical filter mask 1400, such as four transmissive regions 1404. Circular transmissive regions 1404 are an example of a plurality of transmissive regions 416.

Transmissive region 416 may have another shape, size, and/or location than shown in the examples of FIGS. 9-14 without departing from the scope hereof. In one class of implementations, each of the examples of transmissive regions 416 shown in FIGS. 9-14 is a hole formed in optical filter mask 412 (e.g., by drilling, milling, or etching). In another class of implementations, each of the examples of transmissive regions 416 shown in FIGS. 9-14 is an optically transparent window, an optically semi-transparent window, or a color filter (e.g., dichroic filter or thin-film filter) physically coupled to optical filter mask 412 or embedded within optical filter mask 412. In the examples of FIGS. 9-14, optical filter masks (e.g., optical filter mask 900) are circularly shaped; each of these optical filter masks may instead have another shape (e.g. square or rectangular) without departing from the scope hereof. In some of the examples of FIGS. 9-14 (e.g., optical filter masks 900 and 1000), optical filter masks are configured to be centered on optical axis 422; each of these optical filter masks may instead be configured to be off-centered from optical axis 422 without departing from the scope hereof.

Optical filter mask 412 may be formed from metal, such as aluminum or stainless steel. The metal may be anodized or blackened to enhance absorption of light blocked by optical filter mask 412. Alternatively, optical filter mask 412 may be formed from a semiconductor substrate, such as silicon, into which transmissive region 416 is etched or grinded. In another embodiment, optical filter mask 412 is formed from an optically transparent substrate (e.g., glass) that is coated with an optically absorbing material (e.g., black paint) to block light in areas not coinciding with transmissive region(s) 416. In another embodiment, optical filter mask 412 is an active optical filter mask having dynamically configurable transmission regions 416, such as an array of electronically controlled mirrors.

In some embodiments, optical filter mask 412 includes a gradual, or "soft", edge between transmissive region 416 (e.g., transmissive regions 904, 1004, 1104, 1204, 1304, and/or 1404) and surrounding opaque regions of optical filter mask 412 (e.g., optical filter masks 900, 1000, 1100, 1200, 1300, and 1400). The gradual edge may be formed from a material (e.g., glass, plastic) with an optical density that spatially increases monotonically from a relatively low value (e.g., 0) at points close to transmissive region 416, to a relatively high value (e.g., 10 or higher) at points close to the surrounding opaque regions. With the gradual edge, transmissive region 416 does not have a sharp edge where transmissivity suddenly decreases (i.e., a spatial step change in transmissivity). Advantageously, the gradual edge reduces how precisely optical filter mask 412 should be positioned on Fourier plane 408. This is particularly beneficial when input light 106 originates from a low-etendue laser for which the point-spread function is small. By comparison, a high-etendue laser has a broad point-spread function that blurs the light source, thereby relaxing the precision needed to position optical filter mask 412. In embodiments where transmissive region 416 is a circle of diameter d (e.g., transmissive regions 904 and 1004), the gradual edge may be an annulus that is centered on the circle, has an inner diameter of d, and has an outer diameter between, for example, 1.1d and 1.2d; any portion of optical filter mask 412 located farther than the outer diameter from the center of the circle may be opaque.

Figure 15:
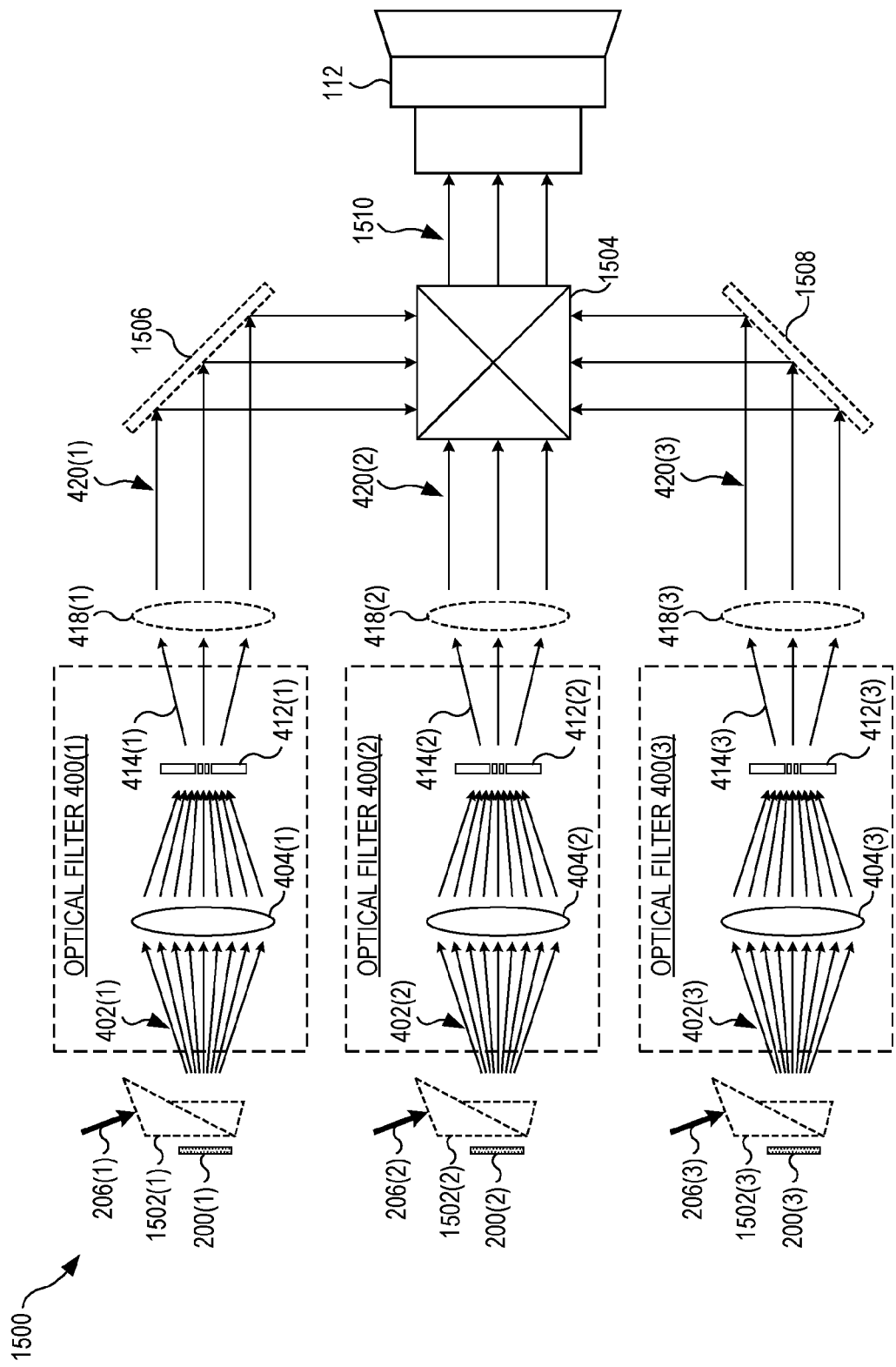
FIG. 15 is a functional diagram of an example multi-color digital projector that achieves increased projector contrast ratio through optical filtering of each color channel in a spatially multiplexed fashion, in embodiments.

FIG. 15 is a functional diagram of an example multi-color digital projector 1500 that achieves increased PCR through optical filtering of each color channel in a spatially multiplexed fashion. Multi-color digital projector 1500 has a plurality of optical filters 400 and a matching number of DMDs 200. Each optical filter 400 is paired with a respective DMD 200 to work with a different respective primary color. In digital projector 1500, each DMD 200 may be replaced by another type of SLM 102 (e.g., reflective LCOS or transmissive LC phase modulator) without departing from the scope hereof. FIG. 15 depicts multi-color digital projector 1500 as having three color channels, and the following discussion is concerned with these three color channels. However, it should be understood that multi-color digital projector 1500 may instead be configured with only two color channels, or with more than three color channels.

DMDs 200(1), 200(2), and 200(3) modulate respective input lights 206(1), 206(2), and 206(3) into respective modulated lights 402(1), 402(2), and 403(3) that are optically filtered by respective optical filters 400(1), 400(2), and 400(3) into respective filtered lights 414(1), 414(2), and 414(3). Multi-color digital projector 1500 further includes a beam combiner 1504 that combines filtered lights 414(1), 414(2), and 414(3) into polychromatic light 1510. Projector lens 112 is configured to project polychromatic light 1510 to a projection screen (e.g., screen 116 of FIG. 1). Multi-color digital projector 1500 is an embodiment of digital projector 100 extended to handling of three separate chromatic inputs to output polychromatic light.

In one embodiment, multi-color digital projector 1500 includes collimating lenses 418(1), 418(2), and 418(3) that collimate respective filtered lights 414(1), 414(2), and 414(3) into respective collimated lights 420(1), 420(2), and 420(3). In this embodiment, beam combiner 1504 combines collimated lights 420(1), 420(2), and 420(3), as shown in FIG. 15. In embodiments of multi-color digital projector 1500 that do not include collimating lenses 418, beam combiner 1504 combines filtered lights 414(1), 414(2), and 414(3) that are not collimated.

In one embodiment, multi-color digital projector 1500 includes total internal reflection (TIR) prisms 1502(1), 1502(2), and 1503(3) that reflect input lights 206(1), 206(2), and 206(3) to respective DMDs 200(1), 200(2), and 200(3), and transmit respective modulated lights 402(1), 402(2), and 402(3) to respective optical filters 400(1), 400(2), and 400(3). Multi-color digital projector 1500 may be configured with mirrors 1506 and 1508 that steer collimated lights 420(1) and 420(3) to beam combiner 1504, as shown in FIG. 15. While shown in FIG. 15 as a cross dichroic, or x-cube, prism, beam combiner 1504 may be another type of beam combiner known in the art.

In one implementation of multi-color digital projector 1500, first, second, and third primary colors are red, green, and blue, respectively. When input lights 206(1), 206(2), and 206(3) are monochromatic, the wavelength of each input light 206(1), 206(2), and 206(3) may be chosen such that input lights 206(1), 206(2), and 206(3) represent red, green, and blue primary colors, respectively, that are spectrally pure. In one such example, the wavelength of input light 206(1) representing the red primary color is one of 615 nm, 640 nm, and 655 nm, the wavelength of input light 206(2) representing the green primary color is one of 525 nm, 530 nm, and 545 nm, and the wavelength of input light 206(3) representing the blue primary color is one of 445 nm, 450 nm, and 465 nm. Alternatively, input lights 206(1), 206(2), and 206(3) may be polychromatic such that red, green, and blue primary colors are not spectrally pure colors. Without departing from the scope hereof, the three primary colors may be a different set of colors than red, green, and blue.

Multi-color digital projector 1500 increases PCR by increasing the PCR of each primary color (e.g., red, green, and blue). Several optical processes used by multi-color digital projector 1500 depend on wavelength, including diffraction of input light 206 by DMD 200, refraction of modulated light 402 by TIR prism 1502, and focusing of modulated light 402 by lens 404. Therefore, the Fraunhofer diffraction pattern of each of modulated lights 402(1), 402(2), and 402(3) depends on wavelength. In one embodiment, optical filter masks 412(1), 412(2), and 412(3) are individually configured based on the wavelength of each of respective input lights 206(1), 206(2), and 206(3) to increase the PCR of first, second, and third primary colors, respectively.

Figure 16:
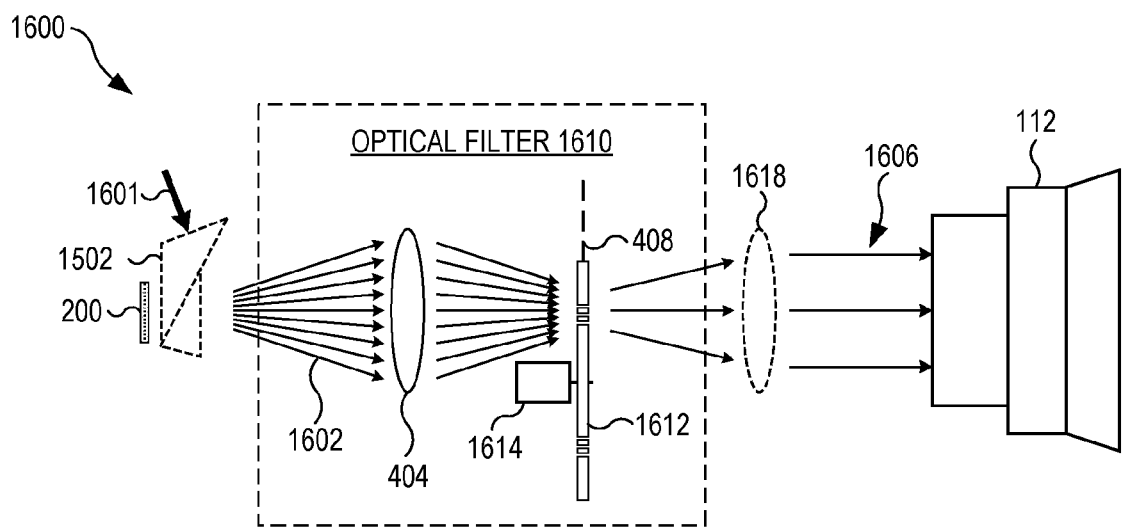
FIG. 16 is a functional diagram of an example multi-color digital projector that achieves increased projector contrast ratio through time-multiplexed optical filtering of different color channels, in embodiments.
Figure 17:
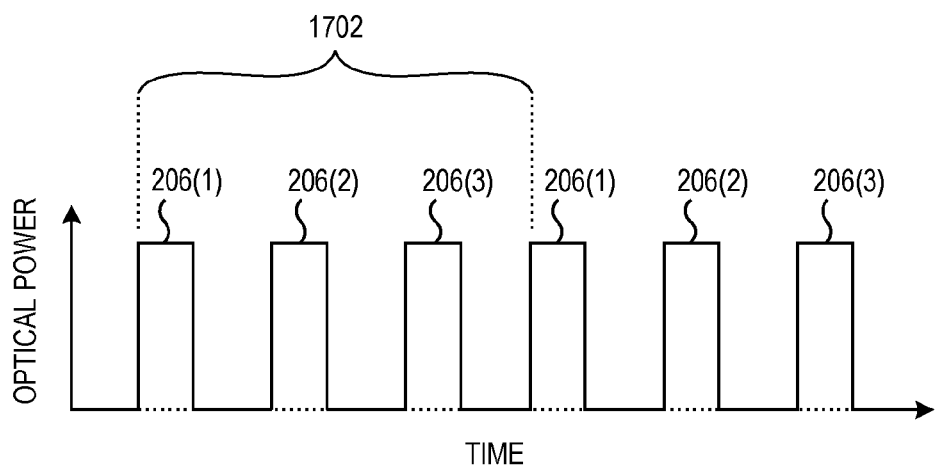
FIG. 17 is a plot of optical power versus time for time-multiplexed light used as input light to the multi-color digital projector of FIG. 16, according to an embodiment.
Figure 18:
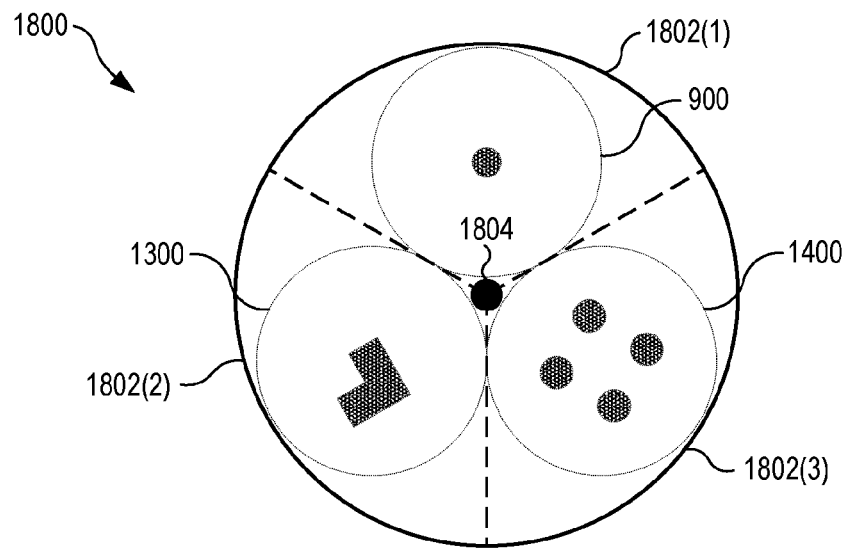
FIG. 18 is a front view of an example filter wheel having three sectors, each containing one optical filter mask, in embodiments.
Figure 19:
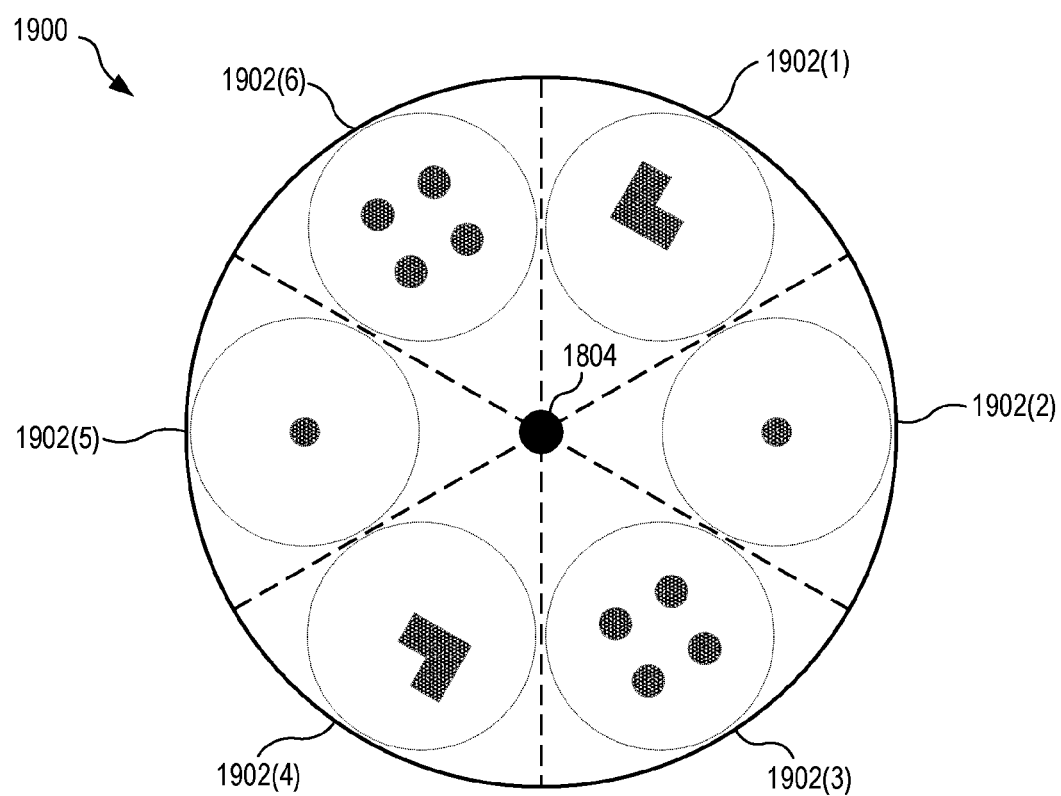
FIG. 19 is a front view of an example filter wheel having six sectors, each containing one optical filter mask, in embodiments.

FIG. 16 is a functional diagram showing an example multi-color digital projector 1600 that achieves increased PCR through time-multiplexed optical filtering of different color channels. Digital projector 1600 includes one DMD 200 and one optical filter 1610 having a filter wheel 1612. FIG. 17 is a plot of optical power versus time for time-multiplexed light 1601 used as input light to multi-color digital projector 1600. FIGS. 18 and 19 show examples of filter wheel 1612. FIGS. 16-19 are best viewed together in the following description.

Time-multiplexed light 1601 includes a repeating sequence 1702 of temporally-separated input lights 206. Although multi-color digital projector 1600 may be configured to accept and output input lights of any number of different colors, FIGS. 17-19 and the following discussion are concerned with a three-color embodiment of multi-color digital projector 1600. In this embodiment, time-multiplexed light 1601 includes temporally-separated input lights 206(1), 206(2), and 206(3). FIG. 17 shows one example of time-multiplexed light 1601, where sequence 1702 includes a first pulse of input light 206(1), a second pulse of input light 206(2), and a third pulse of input light 206(3). Input lights 206(1), 206(2), and 206(3) may represent red, green, and blue primary colors, for example. Pulses of input lights 206(1), 206(2), and 206(3) are spatially overlapped to use the same DMD 200, optical filter 1610, and projector lens 112. In FIG. 17, pulses of input lights 206(1), 206(2), and 206(3) are depicted as having a similar power (e.g., pulse height), duration (e.g., pulse width), and "off" time between pulses (e.g., pulse spacing). Multi-color digital projector 1600 may accept input lights 206 characterized by other configurations of power, duration, and "off" time without departing from the scope hereof. For example, a selected one of first, second, and third pulses of input lights 206(1), 206(2), and 206(3) may have a higher power to compensate for a lower diffraction efficiency of DMD 200 at a wavelength of input light corresponding to the selected pulse.

DMD 200 is configured to synchronously modulate, according to an image, input lights 206(1), 206(2), and 206(3) of time-multiplexed light 1601 into time-multiplexed modulated light 1602. In other words, micromirrors 202 of DMD 200 are manipulated to have a first configuration when time-multiplexed modulated light 1602 is first input light 206(1), a second configuration when time-multiplexed modulated light 1602 is second input light 206(2), and a third configuration when time-multiplexed modulated light 1602 is third input light 206(3). The first, second, and third configurations may be different. In digital projector 1600, DMD 200 may be replaced by another type of SLM 102 (e.g., reflective LCOS or transmissive LC phase modulator) without departing from the scope hereof.

Optical filter 1610 is similar to optical filter 400 of FIG. 4 except that filter wheel 1612 replaces optical filter mask 412. Filter wheel 1612 contains a plurality of optical filter masks 412 configured to synchronously filter input lights 206(1), 206(2), and 206(3) of time-multiplexed modulated light 1602. For example, in the embodiment where filter wheel 1612 contains first, second, and third optical filter masks corresponding to first, second, and third input lights 206(1), 206(2), and 206(3), motor 1614 rotates filter wheel 1612 such that a first optical filter mask 412 intercepts and filters time-multiplexed modulated light 1602 at Fourier plane 408 when time-multiplexed modulated light 1602 is first input light 206(1), a second optical filter mask 412 intercepts and filters time-multiplexed modulated light 1602 at Fourier plane 408 when time-multiplexed modulated light 1602 is second input light 206(2), and a third optical filter mask 412 intercepts and filters time-multiplexed modulated light 1602 at Fourier plane 408 when time-multiplexed modulated light 1602 is third input light 206(3).

In one embodiment of multi-color digital projector 1600, motor 1614 rotates filter wheel 1612 in a stepwise manner to switch between different optical filter masks 412 synchronously with the sequence of pulses of input lights 206(1), 206(2), and 206(3), while maintaining a stationary position of filter wheel 1612 during the propagation of each of these pulses through Fourier plane 408. In this embodiment, motor 1614 operates as follows: Prior to a pulse of input lights 206(1), 206(2), and 206(3) reaching Fourier plane 408, motor 1614 rotates filter wheel 1612 to position a corresponding optical filter mask 412 in the path of time-multiplexed modulated light 1602 at Fourier plane 408. After the corresponding pulse of filtered light has finished propagating through optical filter mask 412, motor 1614 then rotates filter wheel 1612 to position the next optical filter mask 412 in the path of time-multiplexed modulated light 1602 at Fourier plane 408.

In certain embodiments, lens 404, as implemented in optical filter 1610 to focus time-multiplexed modulated light 1602, may be configured to reduce chromatic aberrations that cause the focal length of lens 404 to change with wavelength. In one such embodiment, lens 404 is an achromatic lens designed to focus similarly at the wavelengths of input lights 206(1), 206(2), 206(3) so that Fourier planes corresponding to each of the three wavelengths are similarly positioned. In another such embodiment, lens 404 is an apochromatic lens, superachromatic lens, objective lens, compound lens with multiple lens elements, an assembly of several lenses and/or other optical elements, or another type of lens known in the art. Lens 404 may have one or more anti-reflection coatings that enhance transmission of time-multiplexed modulated light 1602 through lens 404 at the wavelengths of input lights 206(1), 206(2), 206(3).

In one embodiment, multi-color digital projector 1600 is configured with a collimating lens 1618 that collimates filtered time-multiplexed light, as transmitted by filter wheel 1612, into collimated time-multiplexed light 1606 that is projected onto a screen by projector lens 112. In another embodiment, projector lens 112 is configured to accept time-multiplexed light that is not collimated, wherein collimating lens 1618 is not included with multi-color digital projector 1600.

FIG. 18 is a front view of an example filter wheel 1800 having three sectors 1802, each containing one optical filter mask. Filter wheel 1800 is an example of filter wheel 1612. Motor 1614 rotates filter wheel 1800 about an axle 1804, with each rotation of filter wheel 1800 corresponding to one sequence 1702 of time-multiplexed light 1602. In some embodiments, motor 1614 rotates filter wheel 1800 in a stepwise manner, as described previously. In the example of FIG. 18, a first optical filter mask of first sector 1802(1) is shown as optical filter mask 900 of FIG. 9, a second optical filter mask of second sector 1802(2) is shown as optical filter mask 1300 of FIG. 13, and a third optical filter mask of third sector 1802(3) is shown as optical filter mask 1400 of FIG. 14. However, the optical filter masks of sectors 1802 may be configured with transmissive regions (e.g., transmissive region 416) having other shapes, sizes, and locations than shown in FIG. 18 without departing from the scope hereof.

In one embodiment, multi-color digital projector 1600 is configured to display images without certain temporal artifacts, and the duration of sequence 1702 is, for this purpose, shorter than a response time of the human visual system. For example, the multiplexing frequency of time-multiplexed light 1601, equal to an inverse of the duration of sequence 1702, may be higher than a flicker fusion rate to utilize persistence of vision. The multiplexing frequency may be 1 kilohertz or higher, corresponding to pulse width less than 1 millisecond for each of input lights 206(1), 206(2), and 206(3).

FIG. 19 is a front view of an example filter wheel 1900 that has six sectors 1902, each containing one optical filter mask. Motor 1614 rotates filter wheel 1900 about axle 1804 such that each full rotation of filter wheel 1900 corresponds to two consecutive iterations of sequence 1702. One advantage of filter wheel 1900 over filter wheel 1800 is that filter wheel 1900 rotates at half the multiplexing frequency of time-multiplexed light 1601, thereby reducing power consumption and speed requirements of motor 1614. In another embodiment, filter wheel 1612 has 3×n sectors, wherein n is a positive integer. Each set of three sectors contains three optical filter masks, and each full rotation of filter wheel 1900 corresponds to n consecutive iterations of sequence 1702, thereby allowing motor 1614 and filter wheel 1612 to rotate at 1/n times the multiplexing frequency of time-multiplexed light 1601. In one use scenario, motor 1614 rotates filter wheel 1900 in a stepwise manner, such that each optical filter mask of filter wheel 1900 is stationary while filtering a corresponding pulse of input light 206.

Figure 20:
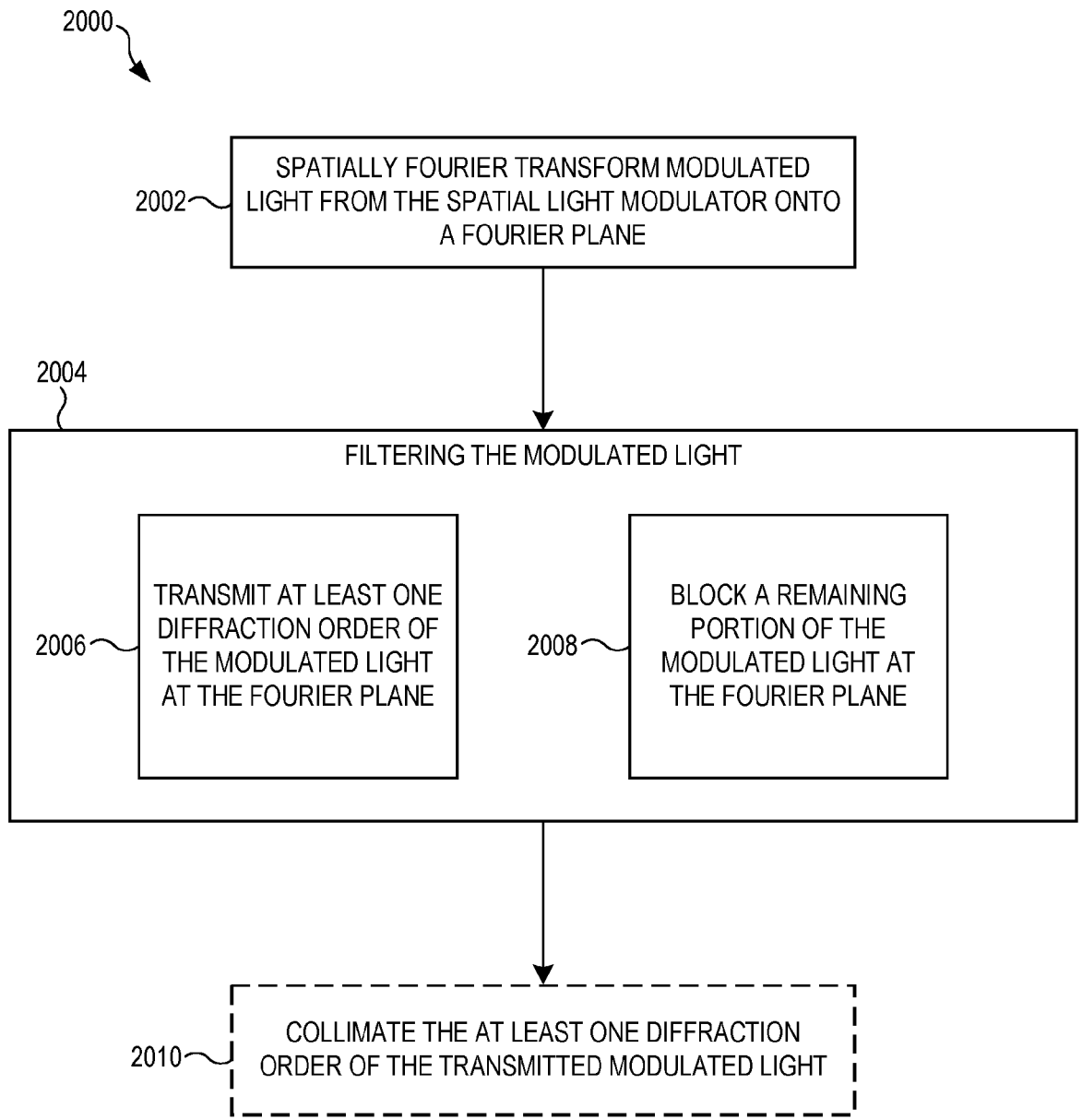
FIG. 20 shows a method for improving contrast of an image generated with a spatial light modulator, in embodiments.

FIG. 20 shows a method 2000 for improving contrast of an image generated with a spatial light modulator. Method 2000 may be performed by optical filter 400. Method 2000 includes a step 2002 to spatially Fourier transform modulated light from the spatial light modulator onto a Fourier plane. The modulated light includes a plurality of diffraction orders. In one example of step 2002, lens 404 spatially Fourier transforms modulated light 402 onto Fourier plane 408. Method 2000 also includes a step 2004 to filter the modulated light as Fourier transformed by step 2002. Step 2004 includes two steps 2006 and 2008 that may occur simultaneously. Step 2006 transmits at least one diffraction order of the modulated light at the Fourier plane. Step 2008 blocks a remaining portion of the modulated light at the Fourier plane. In one example of steps 2006 and 2008, optical filter mask 412 transmits at least one diffraction order of modulated light 402 through transmissive region(s) 416 at Fourier plane 408, and blocks a remaining portion of modulated light 402 at Fourier plane 408. In another example of steps 2006 and 2008, optical filter mask 412 transmits the zeroth diffraction order of modulated light 402 through transmissive region(s) 416 at Fourier plane 408, and blocks a remaining portion of modulated light 402 at Fourier plane 408. In another example of method 2000, modulated light 402 is monochromatic light. In another example of method 2000, modulated light 402 is one of red light, green light, and blue light. In another example of method 2000, modulated light 402 is polychromatic light formed by combining red light, green light, and blue light. In this example, modulated light 402 may be white light. In an embodiment, method 2000 further includes a step 2010 to collimate, after step 2006, the at least one diffraction order of the transmitted modulated light. In one example of step 2010, collimating lens 418 collimates filtered light 414.

Figure 21:
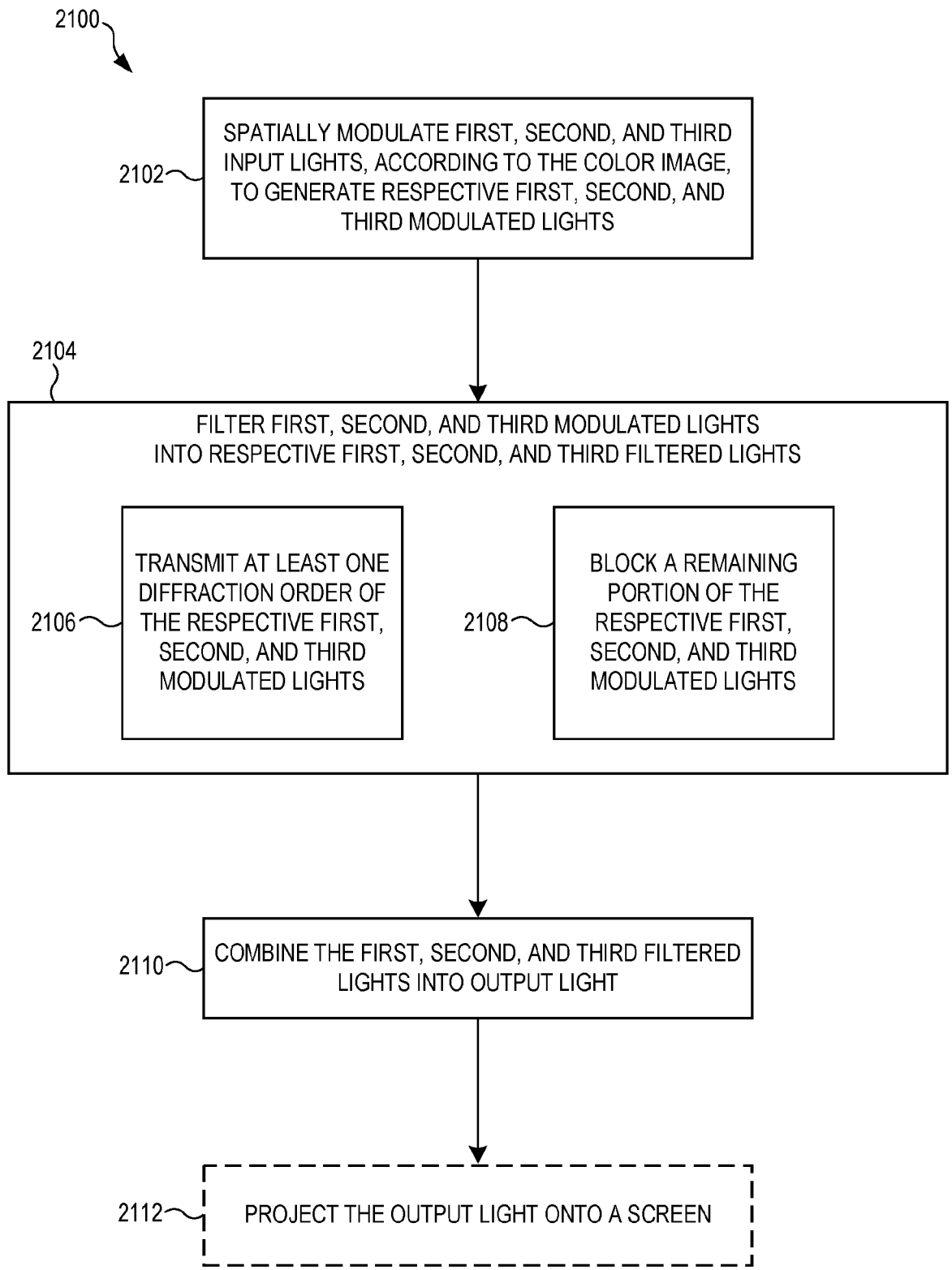
FIG. 21 shows a method for projecting a color image with increased contrast through optical filtering of each color channel in a spatially multiplexed fashion, in embodiments.

FIG. 21 shows a method 2100 for projecting a color image with increased contrast through optical filtering of each color channel in a spatially multiplexed fashion. Method 2100 may be performed by multi-color digital projector 1500. Method 2100 includes a step 2102 to spatially modulate first, second, and third input lights, according to the color image, to generate respective first, second, and third modulated lights. The first, second, and third input lights may represent light for three different respective color channels of the color image, as discussed above in reference to FIG. 15. Each of the first, second, and third modulated lights includes a plurality of diffraction orders. In one example of step 2102, DMDs 200(1), 200(2), and 200(3) of FIG. 15 spatially modulate respective first, second, and third input lights 206(1), 206(2), and 206(3) into respective first, second, and third modulated lights 402(1), 402(2), and 402(3). Method 2100 also includes a step 2104 to filter the first, second, and third modulated lights (generated in step 2102) into respective first, second, and third filtered lights. In an embodiment, step 2104 performs method 2000 on each of the first, second, and third modulated lights to produce the first, second, and third filtered lights. In one example of such an embodiment of step 2104, optical filter masks 412(1), 412(2), and 412(3) of multi-color digital projector 1500 filter respective first, second, and third modulated lights 402(1), 402(2), and 402(3), as Fourier transformed, into respective first, second, and third filtered lights 414(1), 414(2), and 414(3). Step 2104 includes steps 2106 and 2108 that may occur simultaneously. Step 2106 transmits at least one diffraction order of each of the first, second, and third modulated lights. Step 2108 blocks a remaining portion of the first, second, and third modulated lights. In one example of steps 2106 and 2108, optical filter masks 412(1), 412(2), and 412(3) of multi-color digital projector 1500 transmit at least one diffraction order of each of first, second, and third modulated lights 402(1), 402(2), and 402(3), as Fourier transformed, and block a remaining portion of first, second, and third modulated lights 402(1), 402(2), and 402(3). Method 2100 also includes a step 2110 to combine the first, second, and third filtered lights, generated in step 2104, to form output light. In one example of step 2110, beam combiner 1504 combines first, second, and third filtered lights 414(1), 414(2), and 414(3) into output light 1510. In an embodiment, method 2100 further includes a step 2112 to project the output light onto a screen. In one example of step 2112, projector lens 112 projects output light 1510 onto a screen, such as projection screen 116.

Without departing from the scope hereof, method 2100 may be extended to process only two color channels, or more than three color channels, for example four color channels.

Figure 22:
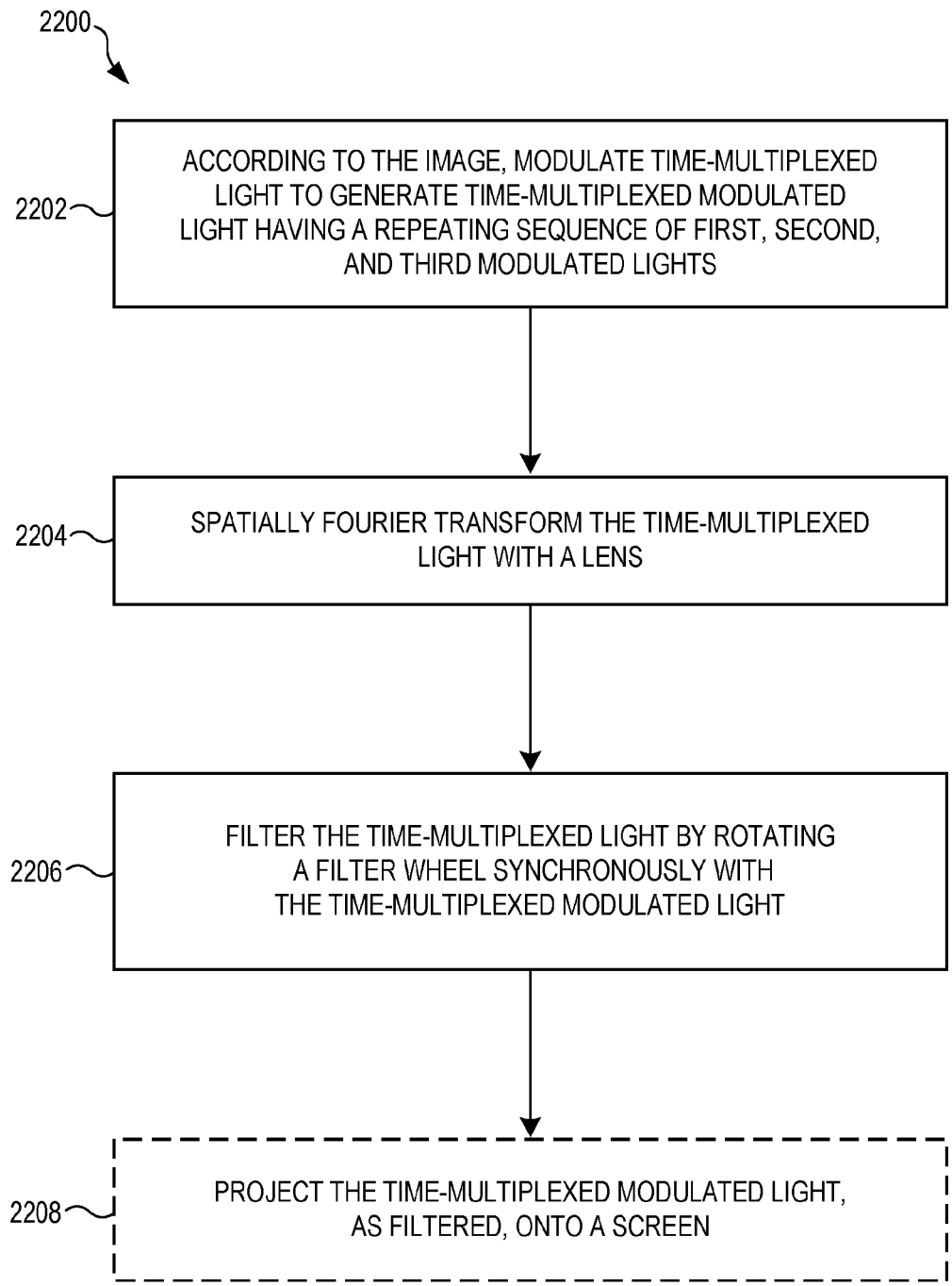
FIG. 22 shows a time-multiplexing method for generating and projecting a color image with increased contrast, in embodiments.

FIG. 22 shows a time-multiplexing method 2200 for generating and projecting a color image with increased contrast. Method 2200 may be performed by multi-color digital projector 1600. Method 2200 includes a step 2202 to modulate time-multiplexed light, according to the color image to be projected, with a spatial light modulator to generate time-multiplexed modulated light having a repeating sequence of first, second, and third modulated lights. The first, second, and third modulated lights may represent light for three different color channels of the color image, as discussed above in reference to FIG. 16. In one example of step 2202, DMD 200 of multi-color digital projector 1600 modulates time-multiplexed light 1601 into time-multiplexed modulated light 1602. Method 2200 also includes a step 2204 to spatially Fourier transform the time-multiplexed modulated light (generated in step 2202) with a lens. In one example of step 2204, lens 404 spatially Fourier transforms time-multiplexed modulated light 1602. Method 2200 further includes a step 2206 to filter the time-multiplexed modulated light, as spatially Fourier transformed by step 2204, by rotating a filter wheel synchronously with the time-multiplexed modulated light. The filter wheel includes a plurality of optical filter masks, each configured to filter a corresponding one of the first, second, and third modulated lights as spatially Fourier-transformed by the lens in step 2204. Step 2206 rotates the filter wheel to position each of the optical filter masks in the spatially Fourier transformed light when the time-multiplexed modulated light is the corresponding one of the first, second, and third modulated lights. In one example of step 2206, motor 1614 rotates filter wheel 1612 synchronously with time-multiplexed modulated light 1602, as discussed above in reference to FIG. 16. In another example of step 2206, motor 1614 rotates filter wheel 1612 in a stepwise manner so that each optical filter mask is stationary while filtering a corresponding modulated light. In one embodiment, method 2200 further includes a step 2208 to project the time-multiplexed modulated light, as filtered, onto a screen. As an example of step 2208, projector lens 112 projects time-multiplexed light, as filtered by optical filter mask 1612 and optionally collimated by collimating lens 1618, onto a projector screen.

Without departing from the scope hereof, method 2200 may be extended to process only two color channels, or more than three color channels, for example four color channels.

Numerical Analyses

The following discussion is concerned with numerical analyses to study how contrast ratio of a digital projector, configured with DMD 200, depends upon various parameters, including wavelength, ON and OFF tilt angles of micromirrors 202, tolerances of ON and OFF tilt angles, geometries of transmissive region 416 of optical filter mask 412, angular and spectral diversities of input light 206, and the effective size of the illumination source generating input light 206. Digital projectors 100, 500, 1500, and 1600 may be configured according to the parameters studied in these numerical analyses.

Figure 23:
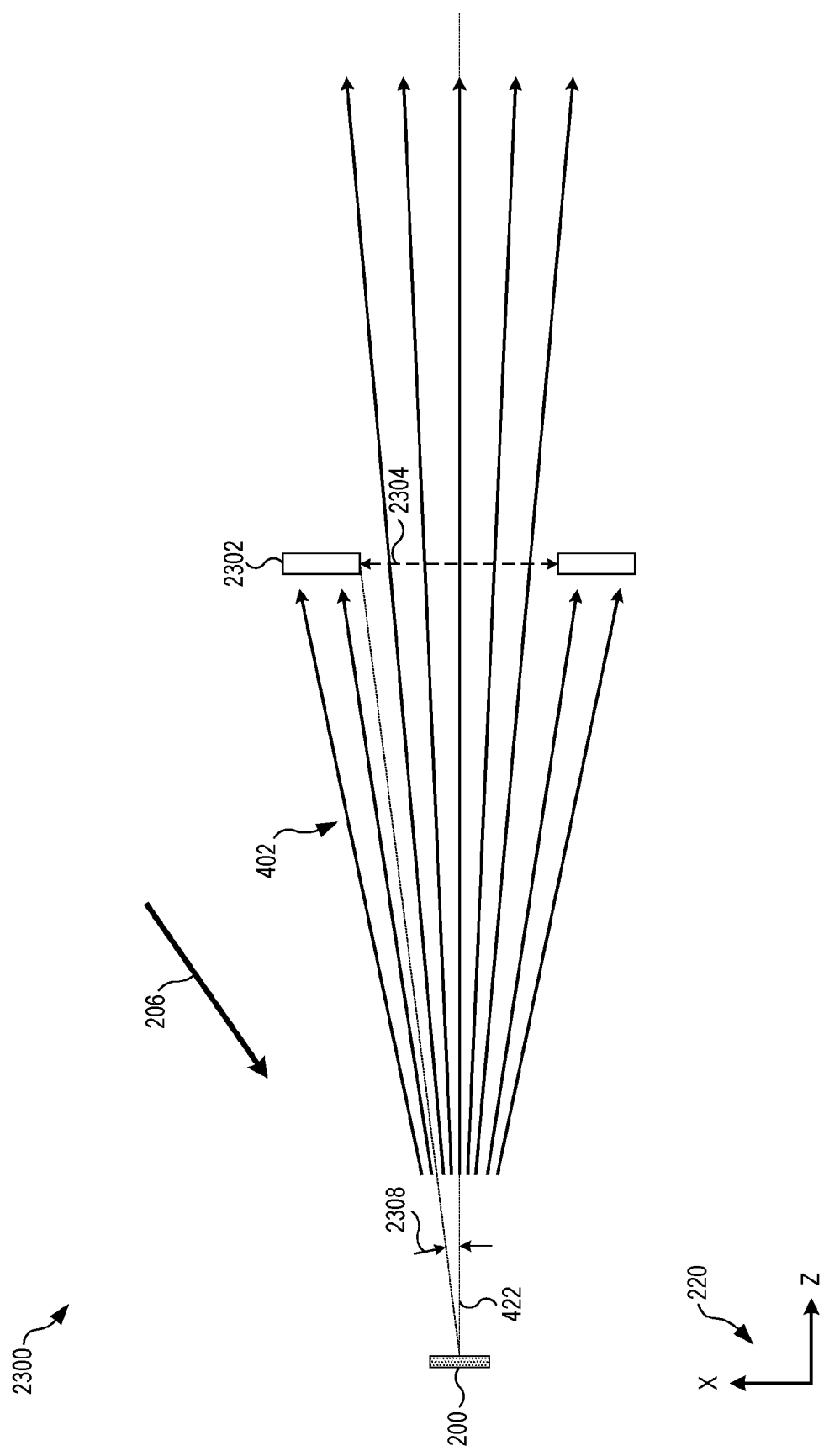
FIG. 23 is a side view of a simulated experiment.

FIG. 23 is a side view of a simulated experiment 2300 for which numerical results are presented in this section. In simulated experiment 2300, DMD 200 modulates input light 206 into modulated light 402 containing a plurality of diffraction orders. A Fraunhofer diffraction pattern of modulated light 402 is calculated, and a spatial filter 2302 is modeled by labeling each diffraction order of the Fraunhofer diffraction pattern as either transmitted or blocked by spatial filter 2302, depending on a geometry and configuration of spatial filter 2302. Spatial filter 2302 is one example of optical filter mask 412. A contrast ratio of simulated experiment 2300 is obtained by numerically integrating diffraction orders labeled as transmitted by spatial filter 2302, once when micromirrors 202 of DMD 200 are configured to be in the ON position, and again when micromirrors 202 of DMD 200 are configured to be in the OFF position. These two numerical integrations correspond to ON and OFF luminous intensities, respectively, the ratio of which defines the contrast ratio.

A Fraunhofer diffraction pattern may be calculated for simulated experiment 2300 using the Rayleigh-Sommerfeld formalism of scalar diffraction theory. This formalism features the Rayleigh-Sommerfeld integral, which expresses a complex amplitude of a diffracted electric field as an integral (e.g., sum) over spherical waves.

It should be understood that the numerical analyses presented herein are not limited to DMD 200 but are readily extended to other embodiments of SLM 102, such as a reflective LCOS phase modulator, or transmissive LC phase modulator.

Figure 24:
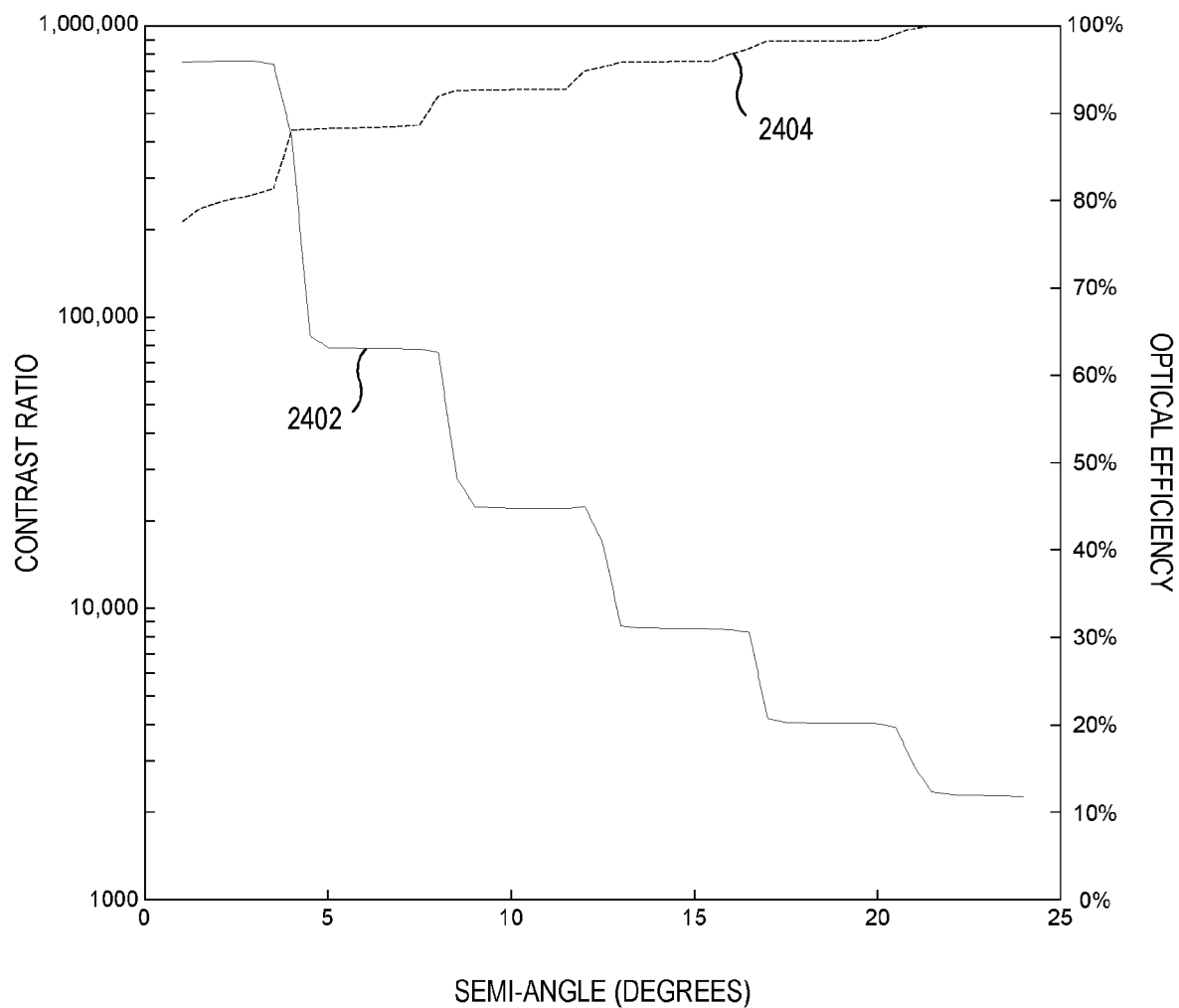
FIGS. 24-26 are plots of contrast ratio and optical efficiency versus semi-angle obtained numerically for the simulated experiment of FIG. 23.
Figure 25:
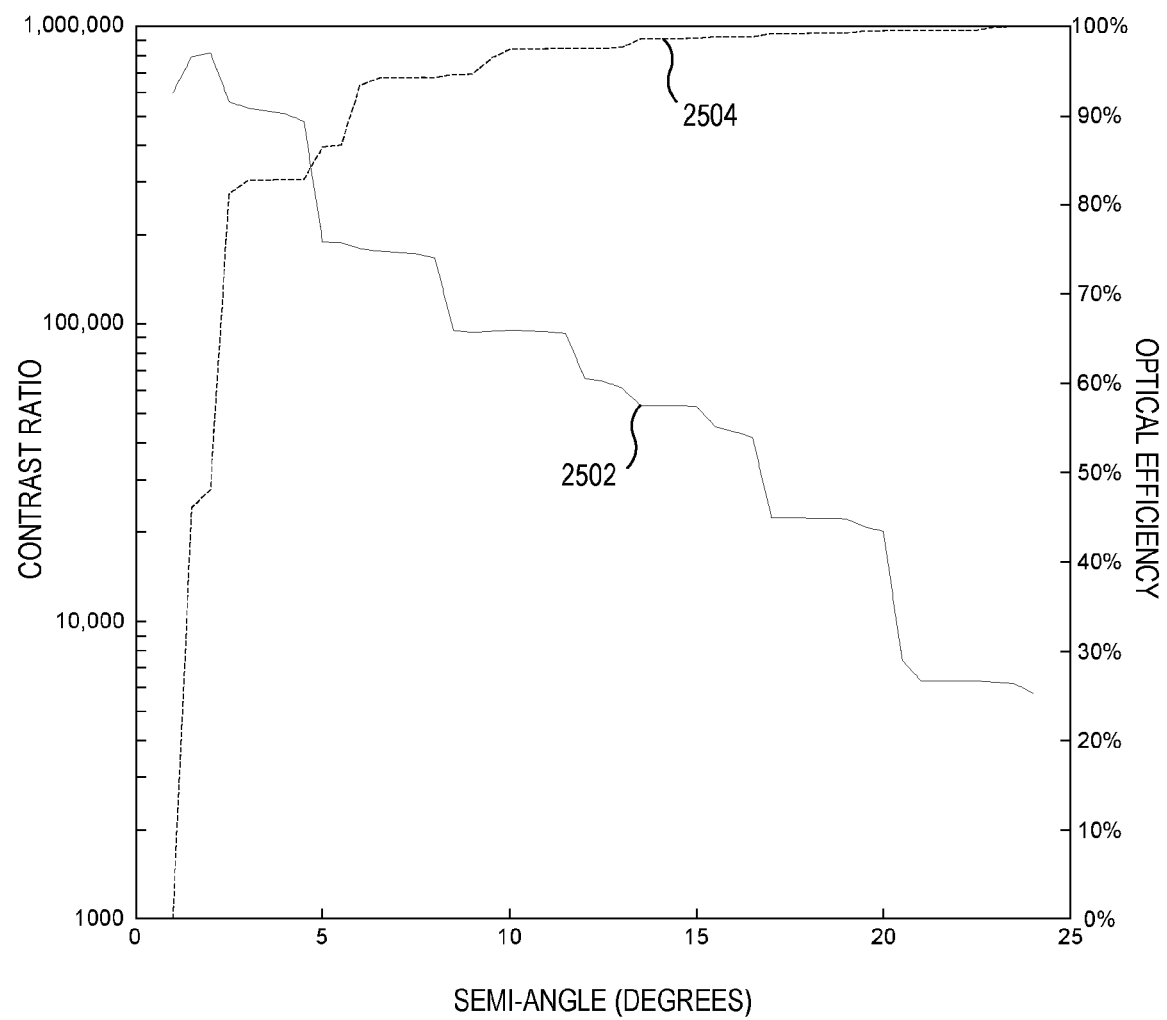
Figure 26:
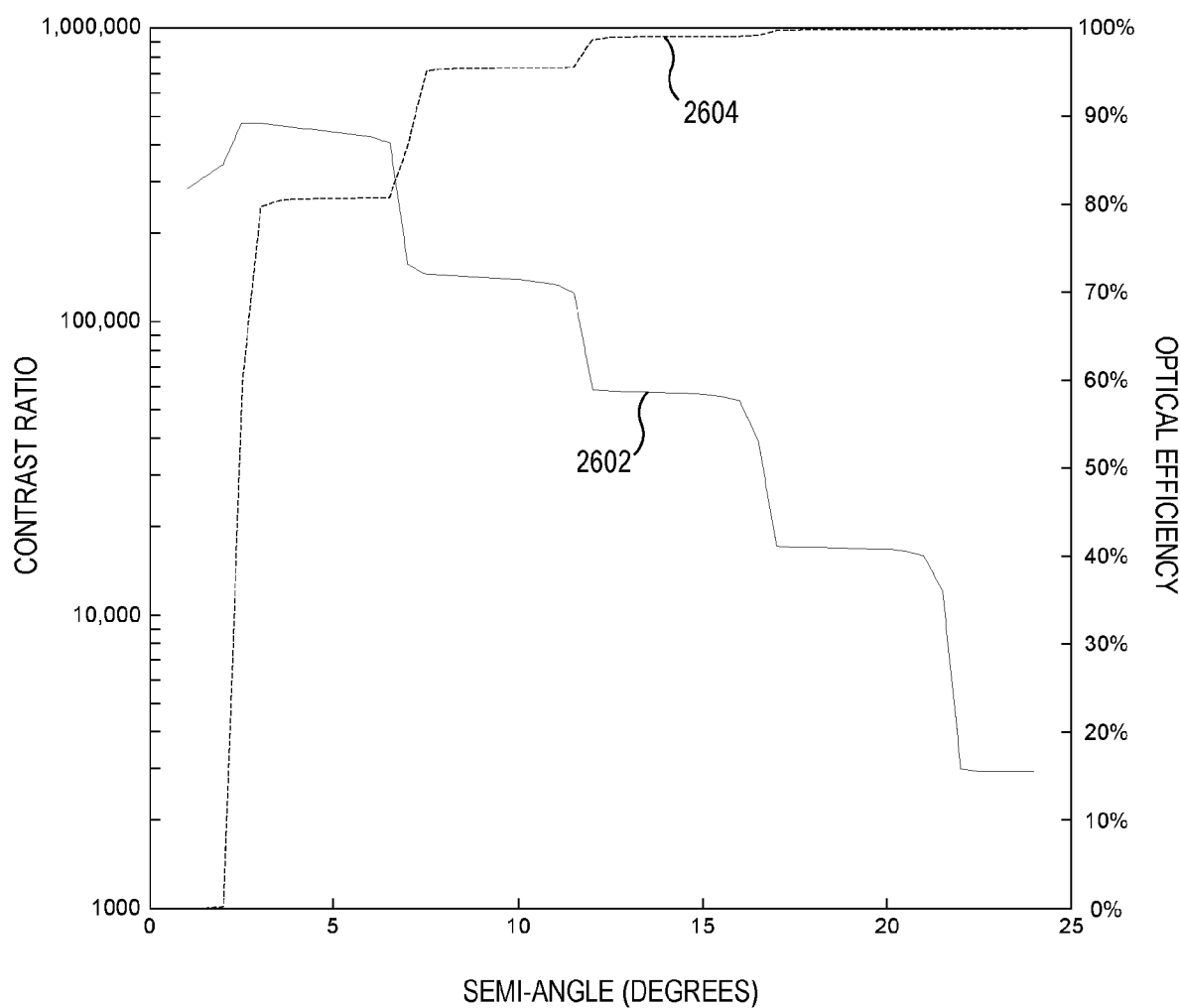

FIGS. 24-26 are plots of contrast ratio and optical efficiency versus semi-angle obtained numerically for simulated experiment 2300. To generate the results of FIGS. 24-26, spatial filter 2302 was modeled as a circular aperture centered on optical axis 422 and having an aperture diameter 2304. Spatial filter 2302 was centered on a zeroth diffraction order of modulated light 402 (e.g., first ON- and OFF-diffracted beams 504(1) and 604(1)). Circular aperture of spatial filter 2302 forms a base of a cone having an apex located at a center of a front face of DMD 200, the cone having an axis coinciding with optical axis 422. Semi-angle 2308 is defined herein as half an apex angle of the cone.

In FIGS. 24-26, wavelengths of 532 nm, 465 nm, and 617 nm, respectively, were used for light in simulated experiment 2300. For micromirrors 202 of DMD 200, nominal ON position and OFF position tilt angles of +12° and −12°, respectively, were used. Dimension and area fill factors of 81% and 90%, respectively, were used for DMD 200.

When semi-angle 2308 is reduced in FIG. 24, a green contrast ratio 2402 increases as a series of "steps" as diffraction orders of modulated light 402 are increasingly blocked by spatial filter 2302. The highest green contrast ratio of 757,000:1 is obtained when only the zeroth diffraction order of modulated light 402 is transmitted by spatial filter 2302. When semi-angle 2308 is increased, a green optical efficiency 2404 increases as a series of "steps" as diffraction orders are increasingly transmitted by spatial filter 2302. As most of the optical power of green modulated light is in low diffraction orders (e.g., zeroth, first, and second diffraction orders), the largest steps in green efficiency 2404 occur at small values of semi-angle 2308. At the highest green contrast ratio, green optical efficiency 2404 is approximately 80%, i.e., 80% of modulated light 402 is transmitted by spatial filter 2302.

In FIG. 25, a blue contrast ratio 2502 and blue optical efficiency 2504 behave similarly to green contrast ratio 2402 and green optical efficiency 2404, respectively. The highest blue contrast ratio of 850,000:1 is obtained when only the zeroth diffraction order of modulated light 402 is transmitted by spatial filter 2302. At the highest blue contrast ratio, blue optical efficiency 2504 drops rapidly from 80% to below 50%.

In FIG. 26, a red contrast ratio 2602 and red optical efficiency 2604 behave similarly to green and blue contrast ratios 2402, 2502 and green and blue optical efficiencies 2404, 2504, respectively. However, the highest red contrast ratio is only 450,000:1. One reason why the highest red contrast ratio is lower than the corresponding highest green and blue contrast ratios is that at the red wavelength of 617 nm, DMD 200 is illuminated far from a blaze condition. At the highest red contrast ratio, red optical efficiency 2604 is approximately 80%.

Figure 27:
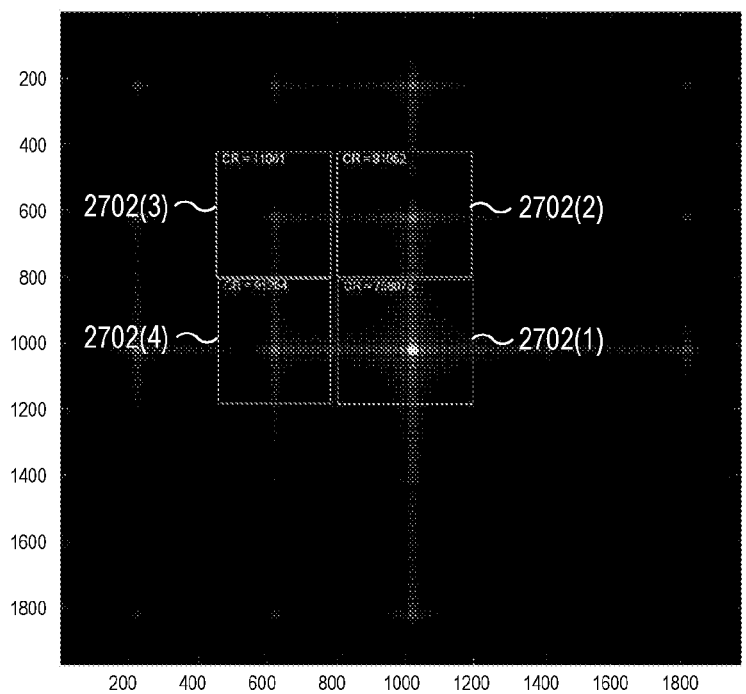
FIG. 27 is a Fraunhofer diffraction pattern for the simulated experiment of FIG. 23 when a wavelength of light is 532 nm and all micromirrors of the DMD are in the ON position.

FIG. 27 is a Fraunhofer diffraction pattern for simulated experiment 2300 when the wavelength of light is 532 nm and all micromirrors 202 of DMD 200 are in the ON position. In FIG. 27, each of the four brightest diffraction orders is surrounded by one of boxes 2702. Box 2702(1) contains the most optical power, and corresponds to the zeroth diffraction order of modulated light 402. For each box 2702, the DOCR was calculated using box 2702 as a rectangular aperture (e.g. transmissive region 416) of spatial filter 2302. The numerically calculated DOCR is printed within each box. For example, in box 2702(1), the zeroth diffraction order of modulated light 402 has a DOCR of 758,075:1. In one embodiment, optical filter mask 412 is configured to transmit the zeroth diffraction order, and block all other diffraction orders, of modulated light 402; optical filter mask 900 is one example of optical filter mask 412 that may be used with this embodiment. In another embodiment, optical filter masks 412(1), 412(2), and 412(3) of multi-color digital projector 1500 may each be configured to transmit the zeroth diffraction order, and block all other diffraction orders, of modulated lights 402(1), 402(2), and 402(3).

Figure 28:
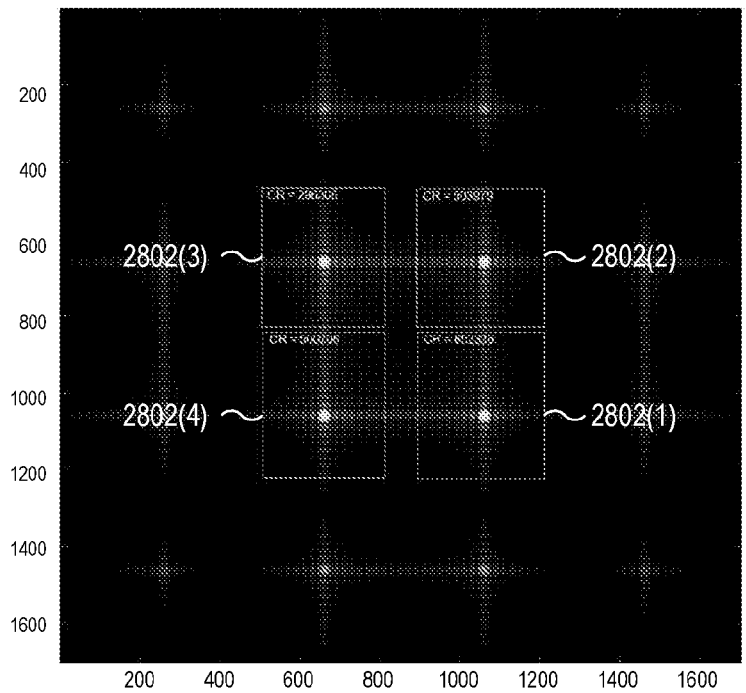
FIG. 28 is a Fraunhofer diffraction pattern for the simulated experiment of FIG. 23 when a wavelength of light is 617 nm and all the micromirrors of the DMD are in the ON position.

FIG. 28 is a Fraunhofer diffraction pattern for simulated experiment 2300 when the wavelength of light is 617 nm and all micromirrors 202 of DMD 200 are in the ON position. In FIG. 28, four diffraction orders contain most of the optical power of modulated light 402. Compared to FIG. 27, where the wavelength of 532 nm was used, the optical power is more evenly distributed among four diffraction orders because the wavelength of 617 nm is farther from the blaze condition of DMD 200. A contrast ratio as high as 852,000:1 may be obtained by forming spatial filter 2302 to only transmit the diffraction order in box 2802(1). However, by blocking diffraction orders in boxes 2802(2), 2802(3), and 2802(4), optical efficiency will be degraded significantly.

As a compromise between contrast ratio and optical efficiency, spatial filter 2302 may be configured to transmit the three diffraction orders with the highest DOCR, corresponding to boxes 2802(1), 2802(2), and 2802(4). In this example of spatial filter 2302, apertures corresponding to boxes 2802(1), 2802(2), and 2802(4) are not located symmetrically about optical axis 422. In one embodiment, optical filter 400 is configured to transmit three diffraction orders of modulated light 402, according to FIG. 28; optical filter mask 1300 is one example of optical filter mask 412 that may be used with this embodiment. In other embodiments, optical filter 412 is configured to transmit a nonzero integer number of diffraction orders of modulated light 402, up to a maximum number determined by a clear aperture of lens 404.

Figure 29:
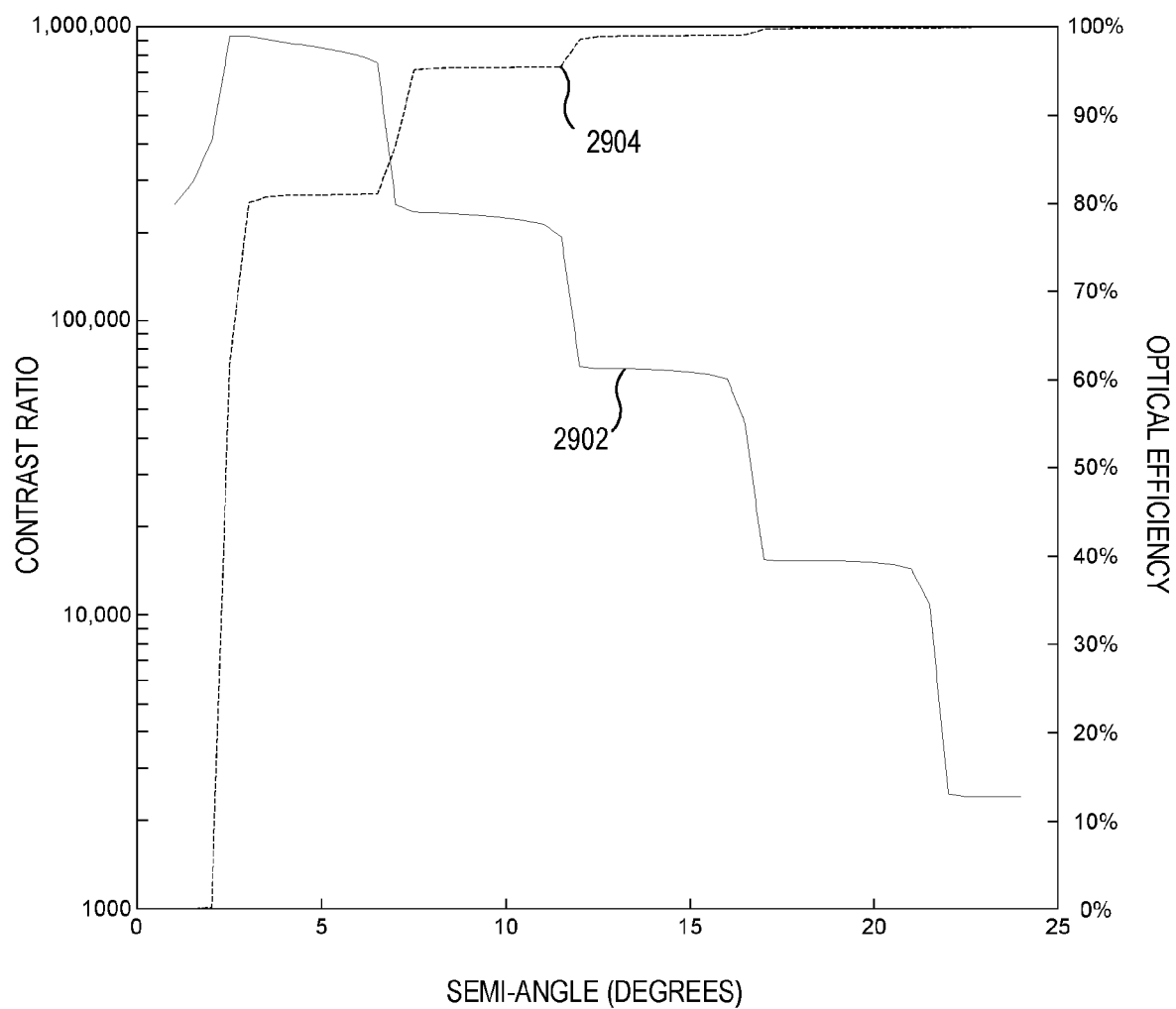
FIG. 29 is a plot of contrast ratio and optical efficiency obtained numerically for the simulated experiment of FIG. 23 operating at a wavelength of 617 nm when the ON and OFF tilt angles of the micromirrors are +12.1° and −12.1°, respectively.

FIG. 29 is a plot of contrast ratio 2902 and optical efficiency 2904 obtained numerically for simulated experiment 2300 operating at a wavelength of 617 nm when the ON and OFF tilt angles of micromirrors 202 are +12.1° and −12.1°, respectively. Contrast ratio may be sensitive to small changes in micromirror tilt angle. Compared to FIG. 26, changing tilt angles by 0.1° increases the highest red contrast ratio more than a factor of two to almost 1,000,000:1, while red optical efficiency 2904 remains at approximately 80%. For comparison, commercial DMDs are typically specified to have a tilt angle tolerance of ±0.5°.

Figure 30:
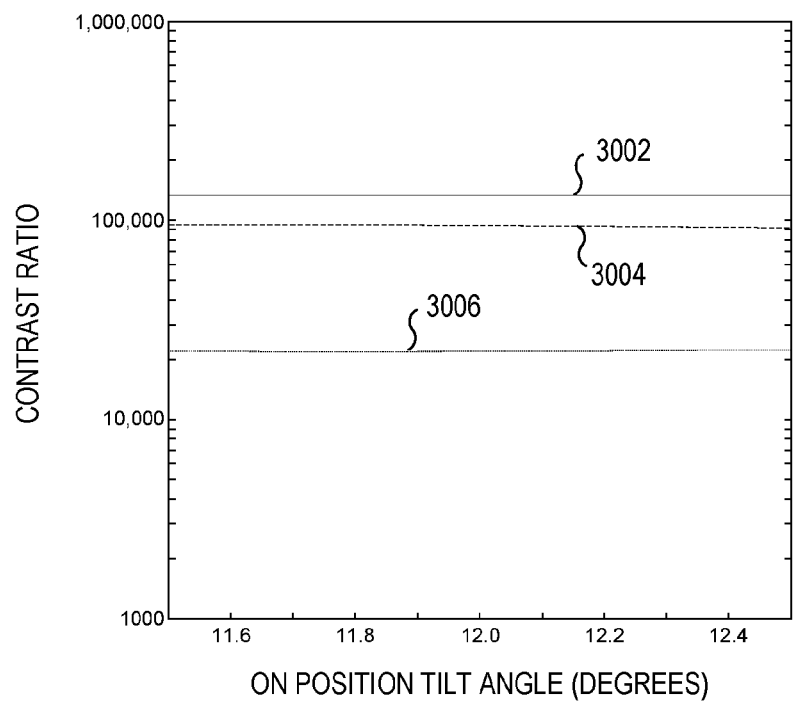
FIGS. 30 and 31 are plots of contrast ratio versus micromirror tilt angle, obtained numerically for the simulated experiment of FIG. 23.
Figure 31:
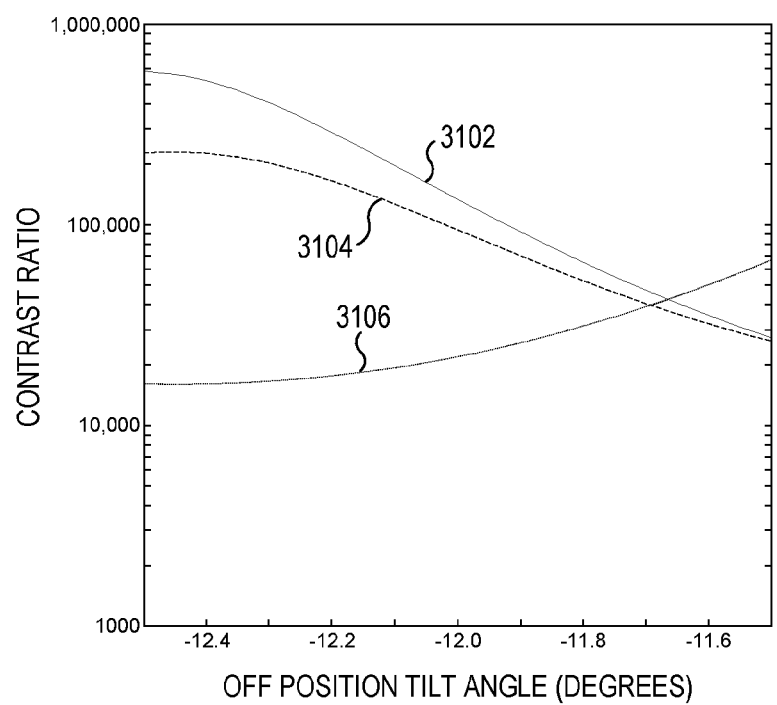

FIGS. 30 and 31 are plots of contrast ratio versus micromirror tilt angle, obtained numerically for simulated experiment 2300. In FIG. 30, the OFF position tilt angle is fixed at −12°, and the ON position tilt angle is varied between 11.5° and 12.5°. In FIG. 31, the ON position tilt angle is fixed at +12°, and the OFF position tilt angle is varied between −12.5° and −11.5°. In FIG. 30, contrast ratios 3002, 3004, and 3006 correspond to wavelengths of 617 nm, 465 nm, and 532 nm, respectively. In FIG. 31, contrast ratios 3102, 3104, and 3106 correspond to wavelengths of 617 nm, 465 nm, and 532 nm, respectively. FIGS. 30 and 31 are best viewed together in the following description.

Values of contrast ratio are generally more sensitive to variations in OFF luminous intensity than ON luminous intensity. Therefore, contrast ratio may depend more strongly on the OFF tilt angle than the ON tilt angle. As shown in FIG. 30, contrast ratios 3002, 3004, and 3006 show little variation with ON tilt angle over the tilt angle tolerance range of ±0.5°. On the other hand, contrast ratios 3102, 3104, and 3106 of FIG. 31 change more strongly with OFF tilt angle over a similar angle tolerance range.

In an embodiment, a digital micromirror device optimized for modulating green light is provided that has a nominal OFF-position tilt angle of more than −12°, such as more than −11.8°, or more than −11.6°. In an example, the digital micromirror device has a nominal OFF-position tilt angle of −11.5° or more.

The digital micromirror device according to this embodiment may improve the ON-OFF contrast ratio when modulating green light.

In an example, the digital micromirror device optimized for modulating green light has a nominal ON-position tilt angle in the range of +11.5° to +12.5°, such as +12°.

In an embodiment, a digital micromirror device optimized for modulating red or blue light is provided that has a nominal OFF-position tilt angle of less than −12°, such as less than −12.2°, or less than −12.4°. In an example, the digital micromirror device has a nominal OFF-position tilt angle of −12.5° or less.

The digital micromirror device according to this embodiment may improve the ON-OFF contrast ratio when modulating red or blue light.

In an example, the digital micromirror device optimized for modulating red or blue light has a nominal ON-position tilt angle in the range of +11.5° to +12.5°, such as +12°.

In an embodiment, a modulator system for generating an image is provided, the modulator system comprising:
  a first digital micromirror device, configured to modulate red light to generate modulated red light;
  a second digital micromirror device, configured to modulate green light to generate modulated green light; and
  a third digital micromirror device, configured to modulate blue light to generate modulated blue light,
  wherein the nominal OFF-position tilt angle of the second digital micromirror device is different than the nominal OFF-position tilt angle of the first and third digital micromirror devices. For example, the first and third digital micromirror device may be of a first type, having a first nominal OFF-position tilt angle, and the second digital micromirror device may be of a second type, having a second nominal OFF-position tilt angle, different from the nominal OFF-position tilt angle of the first type. For example, the first and third digital micromirror device is the digital micromirror device optimized for modulating red or blue light described above, whereas the second digital micromirror device is the digital micromirror device optimized for modulating green light described above.

The modulator system may further comprise:
  first, second and third optical filters, each comprising:
    a lens configured to spatially Fourier transform modulated light from the respective first, second and third spatial light modulator, the modulated light including a plurality of diffraction orders; and
    an optical filter mask positioned at a Fourier plane of the lens and configured to filter the modulated light, as spatially Fourier-transformed by the lens, by transmitting at least one diffraction order of the modulated light, generating respective first, second and third filtered lights, and blocking a remaining portion of the modulated light; and
  a beam combiner configured to combine the first, second, and third filtered lights into output light.

Moreover, the modulator system may optionally also include any of the features described herein, such as the features described in relation to FIGS. 9-15.

Figure 32:
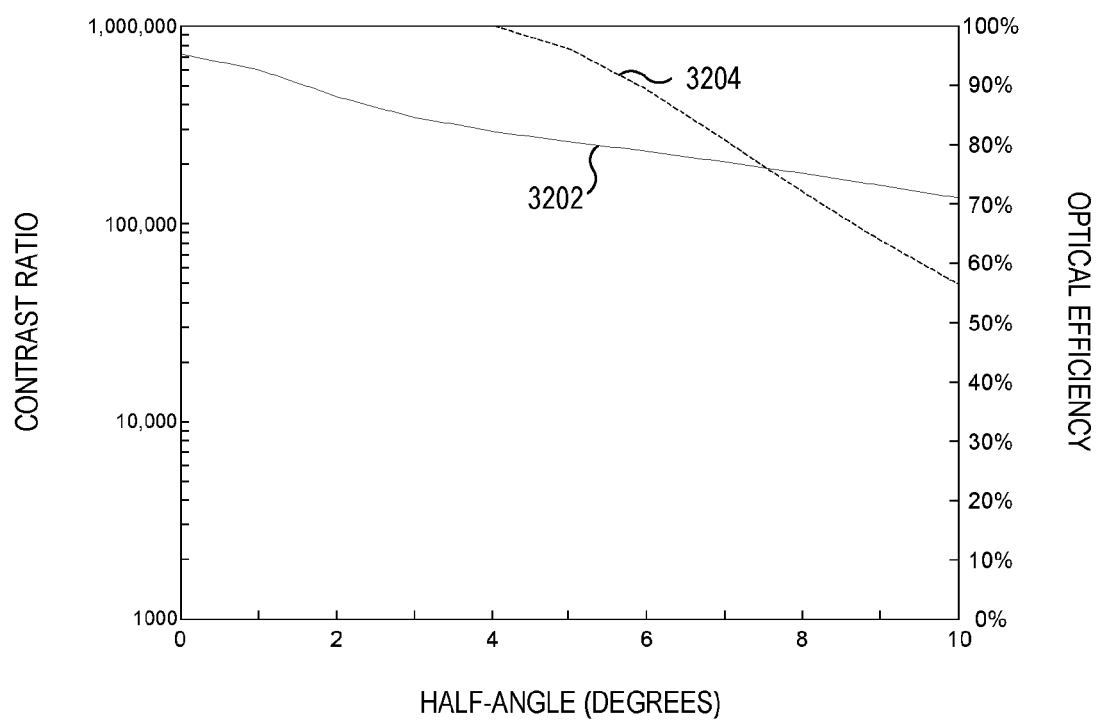
FIG. 32 is a plot of contrast ratio and optical efficiency as a function of angular diversity of the input light, obtained numerically for the simulated experiment of FIG. 23 at a wavelength of 532 nm.
Figure 33:
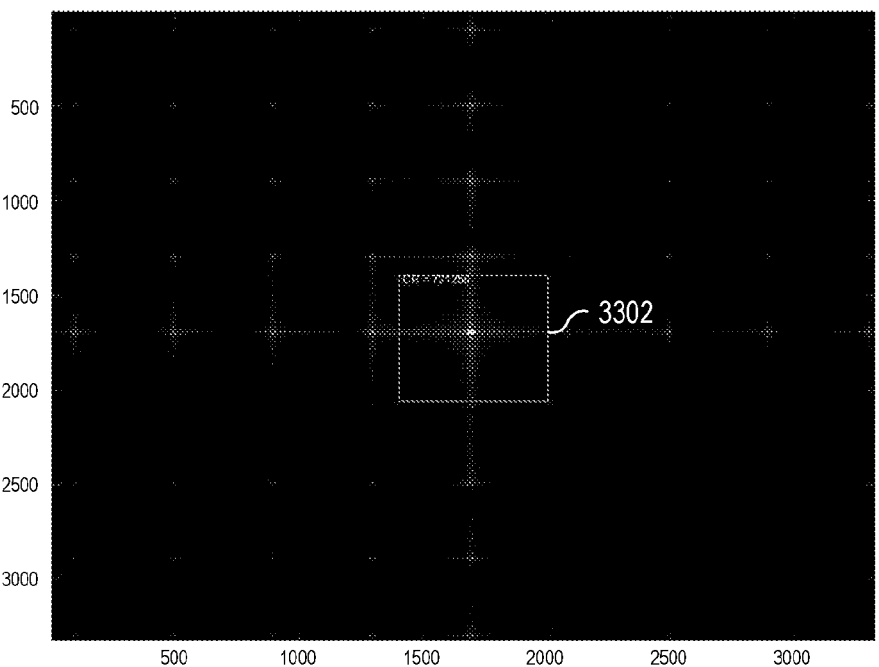
FIGS. 33 and 34 are Fraunhofer diffraction patterns of the simulated experiment of FIG. 23, showing broadening of the diffraction peaks due to the angular diversity of the input light.
Figure 34:
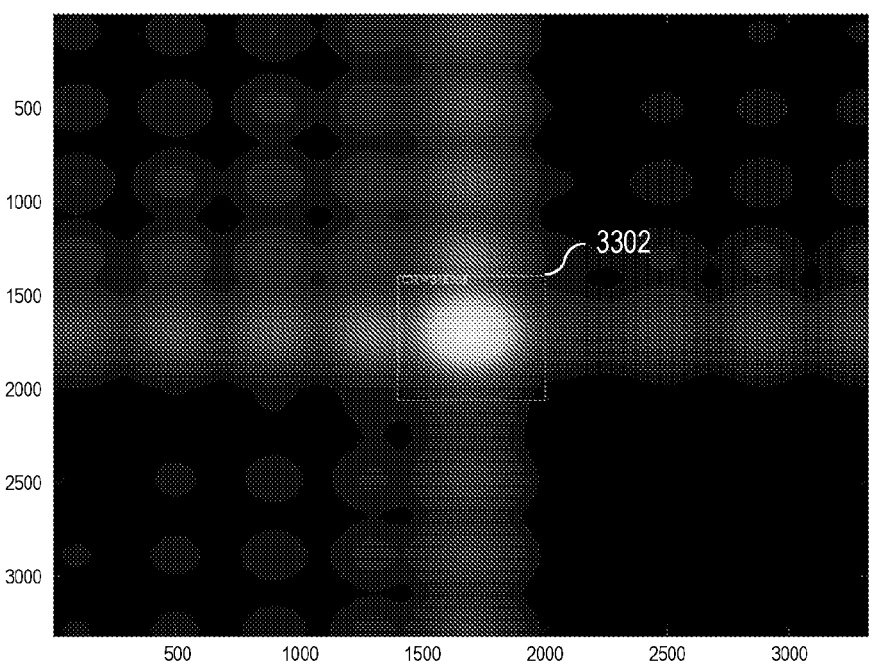

FIG. 32 is a plot of contrast ratio 3202 and optical efficiency 3204 as a function of angular diversity of input light 206, obtained numerically for simulated experiment 2300 at a wavelength of 532 nm. FIGS. 33 and 34 are Fraunhofer diffraction patterns of simulated experiment 2300, showing broadening of the diffraction peaks due to the angular diversity of the input light 206. In FIG. 33, input light 206 is a plane wave with no angular diversity. In FIG. 34, input light 206 has an 8° half-angle of angular diversity. To obtain data in FIG. 32, spatial filter 2302 was configured with a rectangular aperture represented by box 3302 in FIGS. 33 and 34. FIGS. 32-34 are best viewed together in the following description.

In cinema and other critical viewing environments, digital laser projection of images benefits from angular diversity and reduced coherence in the laser illumination, as this reduces the visibility of dust and other objectionable diffracting artifacts. It is also beneficial for the laser illumination to have increased bandwidth to decrease the visibility of speckle on the screen.

Increasing angular diversity and bandwidth of laser illumination may degrade the contrast ratio of optical filtering systems and methods presented herein. Specifically, at a Fourier plane, increased angular diversity and bandwidth may broaden diffraction peaks, causing their tails to blur with other tails of neighboring peaks. Such broadening of peaks may prevent individual diffraction orders from being transmitted through spatial filter 2302 without also transmitting a portion of neighboring diffraction orders intended to be blocked. As shown in FIG. 32, contrast ratio is reduced by half, from 721,000:1 to 346,000:1, as the half-angle of input light 206 is increased to 8°.

Therefore, when considering angular diversity and spectral bandwidth, there is a trade-off between (1) visibility of dust and reduced speckle, and (2) contrast ratio.

It is understood that contrast degradation may result from other factors than diffraction of input light 206 by DMD 200, such as scattering of input light 206 off the surfaces of micromirrors 202, unwanted stray light and reflections in the cinema room, optical aberrations, and/or polarization effects. However, in most digital projectors, diffraction by DMD 200 is expected to be the dominant source, or at least one of the dominant sources, of contrast degradation. The presently disclosed systems and methods are readily extended to scenarios where the contrast is degraded by other factors in addition to diffraction, such as those listed above. The presently disclosed systems and methods can enhance the contrast even in the presence of other such factors.

Experimental Results

The numerical analyses presented above have been verified using an experimental setup similar to that shown in FIG. 4. To demonstrate the highest contrast, the experimental setup was configured to filter a zeroth diffraction order at 532 nm. Optical filter mask 412 was configured with a circular aperture centered on optical axis 422. The diameter of the circular aperture and a lens (e.g., lens 404) were chosen to form a 2° semi-angle at the Fourier plane. Input light to DMD 200 was provided by a polarized 532 nm laser with $M^2<1.1$. The input light was expanded to fill the front face of DMD 200 using a Galilean beam expander formed from two doublets, which yielded diffraction-limited performance. For simplicity, no TIR prism was used to couple light to DMD 200. DMD 200 was operated at brightest (e.g., white level) and darkest (e.g., black level) outputs, and contrast was measured with a spectrometer.

Contrast ratios of two identical 4K DMDs were measured. At 532 nm and 2° semi-angle, the contrast ratio predicted by simulated experiment 2300 is approximately 757,000:1 (see highest green contrast ratio in FIG. 24). Contrast ratios of 254,234:1 and 277,966:1 were measured. These values are approximately a factor of three less than the predicted value; the discrepancy is attributed to stray light originating from overfill of the DMD, stray light originating from the gaps between the micromirrors of the DMD, and scattering off the surface and edges of the micromirrors.

It has also been observed that the propagation direction of input light 206 toward DMD 200 affects the contrast ratio, as expected given the dependency of the contrast ratio on OFF tilt angle. In addition, it has been observed that the polarization of input light 206 affects the black level of DMD 200, thereby affecting the contrast ratio. For the experimental results described above, the polarization of the input light was rotated with a waveplate to maximize contrast.

Given the sensitivity of the contrast ratio on micromirror tilt angles and the propagation direction of input light 206, binning may be used to group DMDs having similar tilt angles. In one embodiment of three-color digital projector 1500, three binned DMDs having similar tilt angles are used for DMDs 200(1), 200(2), and 200(3). In another embodiment, three binned DMDs having dissimilar tilt angles (e.g., from three different bins) are used for DMDs 200(1), 200(2), and 200(3), each of the DMDs having a tilt angle selected to maximize the contrast ratio for a particular wavelength of input light 206 used with the DMD.

DLP Bit Sequences

Figure 35:
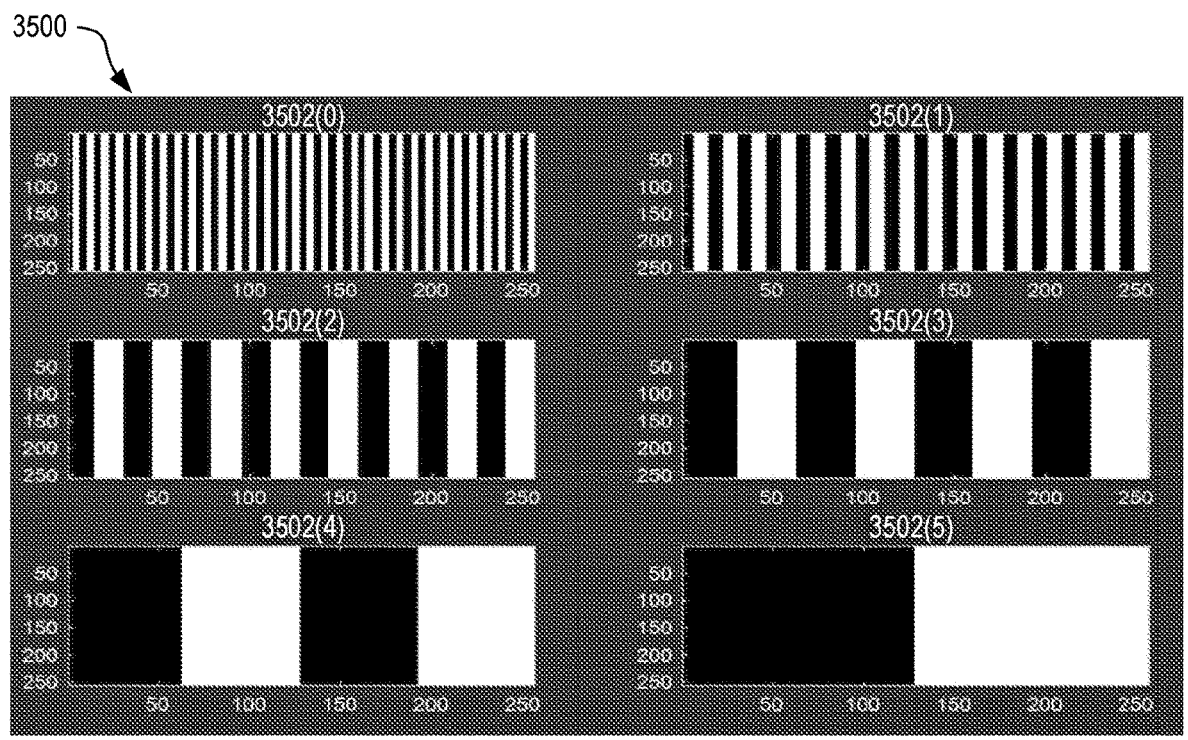
FIG. 35 shows a temporal sequence of example bit planes that determine how the micromirrors of the DMD of FIGS. 2 and 3 are controlled to display one video frame.
Figure 36:
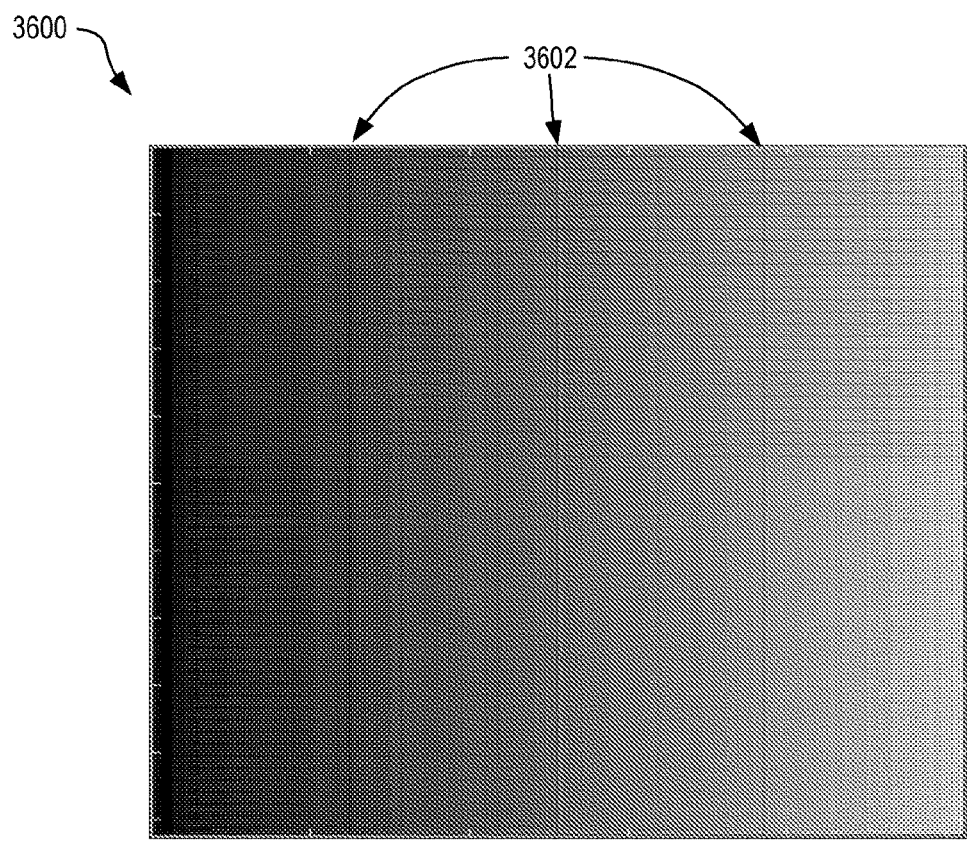
FIG. 36 is a reconstructed frame showing how the one video frame appears when the example bit planes of FIG. 35 control the DMD of FIGS. 2 and 3 to display the one video frame.

FIG. 35 shows a temporal sequence 3500 of example bit planes 3502 that determine how micromirrors 202 of DMD 200 are controlled to display one video frame. FIG. 36 is a reconstructed frame 3600 showing how the one video frame appears when example bit planes 3502 of FIG. 35 control DMD 200 to display the one video frame. FIGS. 35 and 36 are best viewed together with the following description.

Each pixel of a digital video frame is assigned a corresponding pixel level that represents a desired intensity of the pixel. Pixel levels may be represented as n-bit integers where 0 is the lowest intensity level and $2^n-1$ is the highest intensity level. With this representation, the frame may be formed as a sum of n bit planes 3502. A white bit in any of bit planes 3502 represents ON for a corresponding micromirror 202 of DMD 200, while a black bit represents OFF for the corresponding micromirror 202. DMD 200 is sequentially controlled according to each of bit planes 3502 for a time interval $2^i \times \Delta t$, where $\Delta t$ is a minimum time interval and i=0 . . . n−1 indexes bit planes 3502. Thus, in the example of FIG. 35, where pixel levels are represented as 6-bit integers, DMD 200 is controlled according to a first bit plane 3502(0) for a first time interval $\Delta t$, a second bit plane 3502(1) for a second time interval $2\Delta t$, and so on, up to a sixth bit plane 3502(5) for a sixth time interval $32\Delta$. The bits of bit planes 3502 are selected (i.e., 0 or 1 for each bit, corresponding to OFF and ON, respectively, for the corresponding micromirror 202) so that the time-weighted sum of bit planes 3502 gives the desired pixel values for the frame. The frame is displayed quickly enough that the human visual system responds to the time-integral of the displayed sequence 3500 of bit planes 3502.

While FIGS. 35 and 36 show an example where pixel values are represented as 6-bit integers, pixel values may be represented by a different number of bits, and the same number of bit planes, without departing from the scope hereof. While FIG. 35 shows, for clarity, bit planes 3502 having 250 pixels×250 pixels, bit planes 3502 may be sized to control all micromirrors 202 of DMD 200 without departing from the scope hereof.

In prior art digital projection systems, where many diffraction orders are projected onto the screen, the desired pixel level of a pixel is proportional to the ON time for the micromirror that generates the pixel. However, when diffraction orders from DMD 200 are blocked by an optical filter (e.g., optical filter 412) to increase contrast, the amount of light passing through the optical filter (e.g., the zeroth diffraction order) also depends on a spatial pattern of micromirrors 202. Diffraction of input light off the spatial pattern affects how much power is diffracted into each order, and thus how much power passes through the optical filter. In some frames, this combination of spatial pattern and optical filter may generate artifacts 3602 in reconstructed frame 3600. For example, in FIG. 35, bit planes 3502 control DMD 200 to form ON and OFF "stripes" having distinct spatial frequencies, and phase shifts arising from this spatial pattern change the amount of light passing through the optical filter, thereby producing artifacts 3602 that appear as vertical "bands". While only three artifacts 3602 are identified in reconstructed frame 3600, reconstructed frame 3600 contains additional bands of different levels of darkness that are also artifacts. Artifacts 3602 appear as vertical bands in reconstructed frame 3600 because bit planes 3502 form vertical ON and OFF stripes with a distinct horizontal spatial frequency. However, artifacts 3602 will be horizontal bands when bit planes 3502 form horizontal ON and OFF stripes with a distinct vertical spatial frequency.

Figure 37:
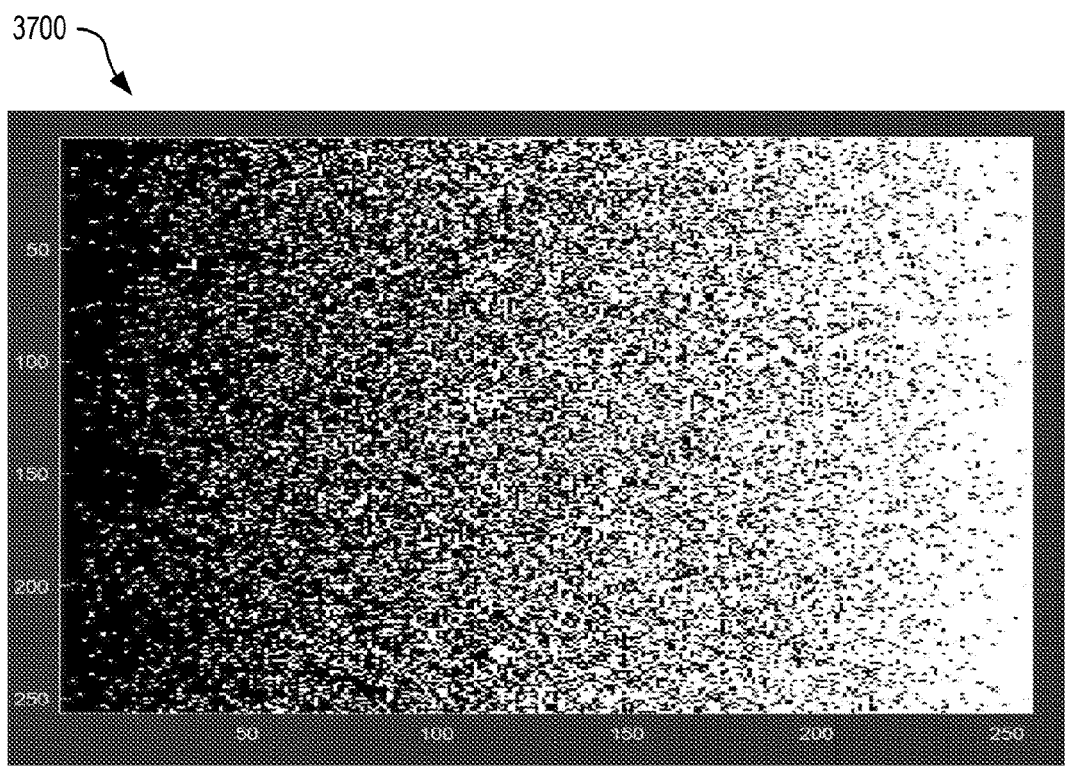
FIG. 37 shows one example of a randomized bit plane that forms part of a randomized bit-plane sequence that may be used with embodiments herein to reduce the presence of artifacts in the reconstructed frame of FIG. 36, in embodiments.
Figure 38:
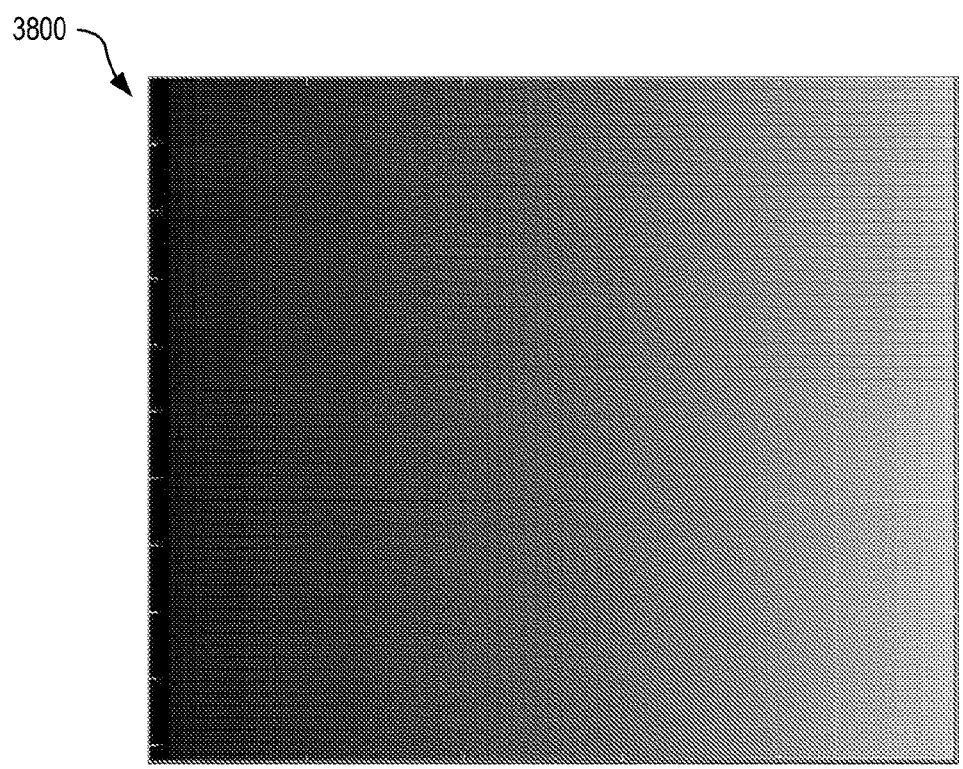
FIG. 38 is a reconstructed frame showing how the one video frame appears when the randomized bit-plane sequence controls the DMD of FIGS. 2 and 3 to display the one video frame.

FIG. 37 shows one example of a randomized bit plane 3700 that forms part of a randomized bit-plane sequence that may be used with embodiments herein to reduce the presence of artifacts 3602. FIG. 38 is a reconstructed frame 3800 showing how the one video frame appears when the randomized bit-plane sequence controls DMD 200 to display the one video frame. Advantageously, the visibility of artifacts in reconstructed frame 3800 is greatly reduced, as compared to reconstructed frame 3600. FIGS. 37 and 38 are best viewed together with the following description.

The randomized bit-plane sequence is formed from $2^n-1$ randomized bit planes, of which randomized bit plane 3700 is one example. The $2^n-1$ randomized bit planes are visually alike (albeit not necessarily identical), and therefore only one is shown in FIG. 37 for clarity. Like bit planes 3502 of FIG. 35, a white bit indicates that the corresponding micromirror 202 of DMD 200 is ON, and a black bit indicates that the corresponding micromirror 202 of DMD 200 is OFF. Unlike bit-plane sequence 3500, where the time intervals of bit planes 3502 increase by powers of 2, each of the $2^n-1$ randomized bit planes has the same time interval Δt.

The random allocation of ON and OFF bits in randomized bit plane 3700 replaces distinct spatial patterns, like those in FIG. 35, with randomized spatial patterns, thereby spreading the effects of diffraction over all the pixels of the frame and advantageously reducing the visibility of artifacts 3602.

In one embodiment, a randomized bit-plane sequence is generated for one frame by initializing $2^n-1$ bit planes such that all bits of all the bit planes are OFF. The $2^n-1$ bit planes are then randomly populated (i.e., by switching bits to "ON") while ensuring that for each pixel, the sum of the $2^n-1$ bits for that pixel never exceeds the corresponding pixel value. The populating of the $2^n-1$ bit planes stops when, for every pixel in the frame, the sum of the $2^n-1$ bits equals the corresponding pixel value.

The randomized bit-plane sequence described above contains a greater number of bit planes than bit-plane sequence 3500 of FIG. 35. However, the two approaches may be combined, i.e., a hybrid bit-plane sequence may be formed with some of bit planes 3502 (i.e., those for shorter time intervals) and some of the randomized bit planes, provided that for each pixel, the time-weighted sum of all the bits in the hybrid sequence equals the corresponding pixel level. In addition, randomized and hybrid bit-plane sequences may be combined with other techniques for adjusting output power levels, such as dithering of micromirrors 202.

A randomized bit-plane sequence may result in a pixel response that is less linear than the pixel response obtained when the optical filter is not used with DMD 200. A non-linear pixel response may be desirable in display devices because human visual perception is a non-linear process, and the non-linearity introduced by the randomized bit-plane sequence more closely matches that of human visual perception. Where the non-linear response is desirable, it may be possible to reduce the number of bits used to represent the pixel values since the projection system displays frames in a more perceptual manner.

The benefits obtained from a randomized or hybrid bit-plane sequence depends on the quality of the input light illuminating DMD 200. When the input light is, for example, a monochromatic laser beam with high coherence and low etendue, artifacts 3602 are more visible, as compared to when the input light has high etendue and/or low coherence (e.g., from a lamp). Thus, randomized and hybrid bit-plane sequences become more important for reducing the visibility of artifacts 3602 when the input light is "high quality".

Advantages

Advantageously, embodiments presented herein increase contrast ratio without using additional DMDs. For example, as an alternative to the presently disclosed systems and methods, the contrast ratio may be increased by using multiple stage modulation, i.e., two or more DMDs connected in series so that OFF-diffracted beams from a first DMD are blocked by a second DMD. As a method of increasing contrast ratio, multiple stage modulation disadvantageously increases cost and complexity of a digital projector due to the second DMD and corresponding electronics. Furthermore, one type of digital projector uses three DMDs, one DMD for each of red light, green light, and blue light; using two DMDs for each color in this type of digital projector increases the total number of DMDs from three to six, further adding to cost and complexity.

Another advantage of the embodiments presented herein is that optically filtered projected light may reduce the appearance of Moiré patterns caused by interference between unfiltered projected light and periodic perforations of the screen onto which the projected light is projected. Specifically, optical filtering may be configured to reduce high frequency components of the projected light, thereby "smoothing" hard edges between pixels, as they appear on the screen. The smoothing reduces beating between the periodic intensity of the projected light and the periodic perforations of the screen.

Yet another advantage of the optical filtering systems and methods presented herein is that optical filtering may increase the contrast ratio of a digital projector that uses a tilt-and-roll pixel (TRP) DLP chip from Texas Instruments. Micromirrors of a TRP DLP chip do not tilt about an axis oriented at 45° (e.g., micromirror rotation axis 208 of FIG. 2). As a result, compared to other types of DMD chips, modulated light propagates away from a TRP chip such that diffracted orders of OFF-state light (e.g., OFF diffracted beams 604 of FIG. 6) are brighter, thereby increasing the OFF luminous intensity and decreasing the contrast ratio. By decreasing the OFF luminous intensity, the optical filtering systems and methods presented herein advantageously enable TRP chips to be included with projectors for applications demanding high contrast ratio, such as projection according to the digital cinema initiatives (DCI) specification.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Various aspects of the present invention may be appreciated from the following enumerated example embodiments (EEEs):

1. An optical filter to increase contrast of an image generated with a spatial light modulator, comprising:
   a lens configured to spatially Fourier transform modulated light from the spatial light modulator, the modulated light including a plurality of diffraction orders; and
   an optical filter mask positioned at a Fourier plane of the lens and configured to filter the modulated light, as spatially Fourier-transformed by the lens, by transmitting at least one diffraction order of the modulated light and blocking a remaining portion of the modulated light.
2. The optical filter of EEE 1, the at least one diffraction order being a zeroth order.
3. The optical filter of EEE 2, the optical filter mask having a transmissive region configured to transmit the zeroth order of the modulated light.
4. The optical filter of EEE 1, the at least one diffraction order comprising a zeroth order and a plurality of first orders.
5. The optical filter of EEE 4, the optical filter mask having a transmissive region configured to transmit the zeroth order and two of the first orders of the modulated light.
6. The optical filter of any of EEEs 1-5, the modulated light being one of red light, green light, and blue light.
7. A modulator system for generating an image with increased contrast, comprising:
   the optical filter of any of EEEs 1-6; and
   a digital micromirror device implementing the spatial light modulator.
8. A modulator system for generating an image with increased contrast, comprising:
   the optical filter of any of EEEs 1-7; and
   a collimating lens positioned to collimate the at least one diffraction order of the modulated light transmitted by the optical filter mask.
9. A modulator system for generating an image with increased contrast, comprising:
   first, second, and third spatial light modulators configured to modulate respective first, second, and third lights according to the image, so as to generate respective first, second, and third modulated lights;
   three instances of the optical filter of any of EEEs 1-6 forming respective first, second, and third optical filters configured to transmit at least one diffraction order of the respective first, second, and third modulated lights, generating respective first, second, and third filtered lights, and block a remaining portion of the respective first, second, and third modulated lights; and
   a beam combiner configured to combine the first, second, and third filtered lights into output light.
10. The modulator system of EEE 9, each of the first, second, and third optical filter masks of the respective first, second, and third optical filters having at least one transmissive region configured to transmit a zeroth diffraction order and a plurality of first diffraction orders of the first, second, and third modulated lights, respectively.
11. The modulator system of EEE 9 or EEE 10, each of the first, second, and third spatial light modulators being a digital micromirror device.
12. The modulator system of any of EEEs 9-11, the first, second, and third lights being red light, green light, and blue light, respectively.
13. The modulator system of any of EEEs 9-12, further comprising first, second, and third output lenses positioned to respectively collimate first, second, and third filtered lights prior to combination by the beam combiner, respectively.
14. The modulator system of any of EEEs 9-13, further comprising a projector lens configured to project the output light onto a screen.
15. A time-multiplexed modulator system for generating an image with increased contrast, comprising:
    a spatial light modulator configured to modulate, according to the image, time-multiplexed light into time-multiplexed modulated light comprising a repeating sequence of first, second, and third modulated lights;
    a lens configured to spatially Fourier transform the time-multiplexed modulated light onto a Fourier plane; and
    a filter wheel positioned at the Fourier plane and comprising a plurality of optical filter masks, each optical filter mask configured to filter a corresponding one of the first, second, and third modulated lights, as spatially Fourier-transformed by the lens, by transmitting at least one diffraction order of the corresponding one of the first, second, and third modulated lights, and blocking a remaining portion of the corresponding one of the first, second, and third modulated lights, the filter wheel being configured to rotate synchronously with the time-multiplexed modulated light such that each optical filter mask is positioned in the time-multiplexed modulated light at the Fourier plane when the time-multiplexed modulated light is the corresponding one of the first, second, and third modulated lights.
16. The time-multiplexed modulator system of EEE 15, the spatial light modulator being a digital micromirror device.
17. The time-multiplexed modulator system of EEE 15 or EEE 16, wherein the plurality of optical filter masks is three optical filter masks respectively configured to filter the first, second, and third modulated lights.
18. The time-multiplexed modulator system of any of EEEs 15-17, wherein the plurality of optical filter masks is three sets of optical filter masks, n being a positive integer, each of the three sets being configured to filter a respective one of the first, second, and third modulated lights.

19. The time-multiplexed modulator system of EEE 17, a first optical filter mask having a transmissive region configured to transmit a zeroth diffraction order and a plurality of first diffraction orders of the first modulated light, a second optical filter mask having a transmissive region configured to transmit a zeroth diffraction order and a plurality of first diffraction orders of the second modulated light, and a third optical filter mask having a transmissive region configured to transmit a zeroth diffraction order and a plurality of first diffraction orders of the third modulated light.

20. The time-multiplexed modulator system of EEE 19, the first, second, and third modulated lights being red light, green light, and blue light, respectively.

21. The time-multiplexed modulator system of EEE 20, the filter wheel being further configured to rotate non-uniformly so as to stop when each optical filter mask is positioned in the time-multiplexed modulated light.

22. The time-multiplexed modulator system of EEE 21, further comprising a projector lens configured to project, onto a screen, the at least one diffraction order of the respective first, second, and third modulated lights transmitted by the filter wheel.

23. A method of improving contrast of an image generated with a spatial light modulator, comprising:
spatially Fourier transforming modulated light from the spatial light modulator onto a Fourier plane, the modulated light including a plurality of diffraction orders; and
filtering the modulated light by:
transmitting at least one diffraction order of the modulated light at the Fourier plane; and
blocking a remaining portion of the modulated light at the Fourier plane.

24. The method of EEE 23, the at least one diffraction order being a zeroth diffraction order.

25. The method of EEE 24, the step of transmitting comprising transmitting the zeroth diffraction order through a transmissive region of an optical filter mask.

26. The method of EEE 23, the at least one diffraction order comprising a zeroth diffraction order and a plurality of first orders.

27. The method of EEE 26, the step of transmitting comprising transmitting the zeroth diffraction order and the plurality of first diffractions orders through a transmissive region of an optical filter mask.

28. The method of any of EEEs 23-27, the modulated light being one of red light, green light, and blue light.

29. The method of any of EEEs 23-28, further comprising manipulating a plurality of micromirrors of the spatial light modulator to generate the modulated light.

30. The method of any of EEEs 23-29, further comprising, after the step of transmitting, collimating the at least one diffraction order of the modulated light.

31. A method for projecting a color image with increased contrast, comprising:
spatially modulating first, second, and third input lights, according to the image, to generate respective first, second, and third modulated lights, each of the first, second, and third modulated lights including a plurality of diffraction orders;
filtering first, second, and third modulated lights into respective first, second, and third filtered lights by:
transmitting at least one diffraction order of the respective first, second, and third modulated lights; and
blocking a remaining portion of the respective first, second, and third modulated lights; and
combining the first, second, and third filtered lights into output light.

32. The method of EEE 31, the first, second, and third input lights being red light, green light, and blue light, respectively.

33. The method of EEE 31 or EEE 32, further comprising projecting the output light onto a screen.

34. A time-multiplexing method for generating and projecting an image with increased contrast, comprising:
according to the image, modulating time-multiplexed light with a spatial light modulator to generate time-multiplexed modulated light comprising a repeating sequence of first, second, and third modulated lights;
spatially Fourier transforming the time-multiplexed modulated light with a lens; and
filtering the time-multiplexed modulated light by rotating a filter wheel synchronously with the time-multiplexed modulated light, the filter wheel including a plurality of optical filter masks, each optical filter mask configured to filter a corresponding one of the first, second, and third modulated lights as spatially Fourier-transformed by the lens, said rotating including positioning each optical filter mask in the time-multiplexed modulated light at a Fourier plane of the lens when the time-multiplexed modulated light is the corresponding one of the first, second, and third modulated lights.

35. The time-multiplexed modulator system of EEE 34, the spatial light modulator being a digital micromirror device.

36. The method of EEE 34 or EEE 35, the plurality of optical filter masks being three optical filter masks respectively configured to filter the first, second, and third modulated lights.

37. The method of any of EEEs 34-36, the plurality of optical filter masks being three sets of optical filter masks, n being a positive integer, each of the three sets being configured to filter a respective one of the first, second, and third modulated lights.

38. The method of EEE 36, the step of filtering comprising:
transmitting a zeroth order and a plurality of first orders of the first modulated light through a transmissive region of a first optical filter mask;
transmitting a zeroth order and a plurality of first orders of the second modulated light through a transmissive region of a second optical filter mask; and
transmitting a zeroth order and a plurality of first orders of the third modulated light through a transmissive region of a third optical filter mask.

39. The method of EEE 36 or EEE 38, the first, second, and third modulated lights being red light, green light, and blue light, respectively.

40. The method of EEE 36, EEE 38 or EEE 39, rotating further comprising rotating non-uniformly and stopping when each optical filter mask is positioned in the time-multiplexed modulated light.

41. The method of EEE 36, EEE 38, EEE 39 or EEE 40, further comprising, after the step of filtering, projecting the time-multiplexed modulated light, as filtered, onto a screen.

The invention claimed is:

1. A time-multiplexed modulator system for generating an image, comprising:
   a spatial light modulator configured to modulate, according to the image, time-multiplexed light into time-multiplexed modulated light forming a repeating sequence of first, second, and third modulated lights;
   a lens configured to spatially Fourier transform the time-multiplexed modulated light onto a Fourier plane; and
   a filter wheel positioned at the Fourier plane and comprising a plurality of optical filter masks, each of the optical filter masks being configured to filter a corresponding one of the first, second, and third modulated lights, as spatially Fourier-transformed by the lens, by transmitting at least one diffraction order of the corresponding one of the first, second, and third modulated lights, and blocking a remaining portion of the corresponding one of the first, second, and third modulated lights, the filter wheel being configured to rotate synchronously with the time-multiplexed modulated light such that each of the optical filter masks is positioned in the time-multiplexed modulated light at the Fourier plane when the time-multiplexed modulated light is the corresponding one of the first, second, and third modulated lights, wherein the first, second, and third modulated lights are red, green, and blue, respectively.

2. The time-multiplexed modulator system of claim 1, the spatial light modulator being a digital micromirror device.

3. The time-multiplexed modulator system of claim 1, wherein the plurality of optical filter masks is three sets of n optical filter masks, n being a positive integer, each of the three sets being configured to filter a respective one of the first, second, and third modulated lights.

4. The time-multiplexed modulator system of claim 1, the plurality of optical filter masks including first, second, and third optical filter masks respectively configured to filter the first, second, and third modulated lights.

5. The time-multiplexed modulator system of claim 4,
   the first optical filter mask having a transmissive region configured to transmit a zeroth diffraction order and/or one or more first diffraction orders of the first modulated light;
   the second optical filter mask having a transmissive region configured to transmit a zeroth diffraction order and/or one or more first diffraction orders of the second modulated light; and
   the third optical filter mask having a transmissive region configured to transmit a zeroth diffraction order and/or one or more first diffraction orders of the third modulated light.

6. The time-multiplexed modulator system of claim 1, wherein each optical filter mask filtering red light is configured transmit a zeroth diffraction order and a plurality of, but not all, first diffraction orders.

7. The time-multiplexed modulator system of claim 6, wherein each optical filter mask filtering red light has an L-shaped transmissive region.

8. The time-multiplexed modulator system of claim 1, wherein each optical filter mask filtering green light is configured to transmit a zeroth diffraction order only.

9. The time-multiplexed modulator system of claim 1, wherein each optical filter mask filtering blue light is configured to transmit a plurality of, but not all, first diffraction orders, and optionally also transmits a zeroth diffraction order.

10. The time-multiplexed modulator system of claim 1, the filter wheel being further configured to rotate non-uniformly to stop when each optical filter mask is positioned in the time-multiplexed modulated light.

11. The time-multiplexed modulator system of claim 1, further comprising a projector lens configured to project, onto a screen, the at least one diffraction order of the respective first, second, and third modulated lights transmitted by the filter wheel.

12. A time-multiplexing method for generating and projecting an image, comprising:
    modulating, according to the image, time-multiplexed light with a spatial light modulator to generate time-multiplexed modulated light comprising a repeating sequence of first, second, and third modulated lights;
    spatially Fourier transforming the time-multiplexed modulated light with a lens; and
    filtering the time-multiplexed modulated light by rotating a filter wheel synchronously with the time-multiplexed modulated light, the filter wheel including a plurality of optical filter masks, each of the optical filter masks being configured to filter a corresponding one of the first, second, and third modulated lights as spatially Fourier-transformed by the lens, said rotating including positioning each of the optical filter masks in the time-multiplexed modulated light at a Fourier plane of the lens when the time-multiplexed modulated light is the corresponding one of the first, second, and third modulated lights, wherein the first, second, and third modulated lights are red, green, and blue, respectively.

13. The method of claim 12, the spatial light modulator being a digital micromirror device.

14. The method of claim 12, the plurality of optical filter masks being three sets of n optical filter masks, n being a positive integer, each of the three sets being configured to filter a respective one of the first, second, and third modulated lights.

15. The method of claim 12, the plurality of optical filter masks being first, second, and third optical filter masks respectively configured to filter the first, second, and third modulated lights.

16. The method of claim 12, wherein the filtering comprises:
    transmitting a zeroth diffraction order and/or one or more first diffraction orders of the first modulated light through a transmissive region of the first optical filter mask;
    transmitting a zeroth diffraction order and/or one or more first diffraction orders of the second modulated light through a transmissive region of the second optical filter mask; and
    transmitting a zeroth diffraction order and/or one or more first diffraction orders of the third modulated light through a transmissive region of the third optical filter mask.

17. The method of claim 12, wherein the rotating further comprises rotating non-uniformly and stopping when each of the first, second, and third optical filter masks is positioned in the time-multiplexed modulated light.

18. The method of any of claim 12, further comprising projecting, after the filtering, the time-multiplexed modulated light, as filtered, onto a screen.

* * * * *